(12) United States Patent
Kim et al.

(10) Patent No.: US 10,862,727 B2
(45) Date of Patent: Dec. 8, 2020

(54) METHOD FOR TRANSMITTING AND RECEIVING PHYSICAL UPLINK CONTROL CHANNEL IN WIRELESS COMMUNICATION SYSTEM, AND DEVICE FOR SUPPORTING SAME

(71) Applicant: LG ELECTRONICS INC., Seoul (KR)

(72) Inventors: Seonwook Kim, Seoul (KR); Kijun Kim, Seoul (KR); Joonkui Ahn, Seoul (KR); Suckchel Yang, Seoul (KR); Yunjung Yi, Seoul (KR); Daesung Hwang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 13 days.

(21) Appl. No.: 16/310,358

(22) PCT Filed: Jun. 16, 2017

(86) PCT No.: PCT/KR2017/006297
§ 371 (c)(1),
(2) Date: Dec. 14, 2018

(87) PCT Pub. No.: WO2017/217799
PCT Pub. Date: Dec. 21, 2017

(65) Prior Publication Data
US 2019/0158334 A1    May 23, 2019

Related U.S. Application Data

(60) Provisional application No. 62/356,484, filed on Jun. 29, 2016, provisional application No. 62/350,724, filed on Jun. 16, 2016.

(51) Int. Cl.
  H04L 27/26    (2006.01)
  H04L 5/00     (2006.01)
  H04W 72/12    (2009.01)

(52) U.S. Cl.
  CPC ............ *H04L 27/2666* (2013.01); *H04L 5/00* (2013.01); *H04L 5/0037* (2013.01);
  (Continued)

(58) Field of Classification Search
  CPC . H04L 27/2666; H04L 5/0007; H04L 5/0037; H04L 5/0048; H04L 5/0053;
  (Continued)

(56) References Cited

U.S. PATENT DOCUMENTS 9,967,863 B2 * 5/2018 Yin .................. H04L 5/0055
2015/0085797 A1  3/2015 Ji et al.
(Continued)

FOREIGN PATENT DOCUMENTS

WO    2017098414    6/2017

OTHER PUBLICATIONS

Qualcomm, "R1-163069 UL Channel Design for Shortened TTI", Apr. 11-15, 2016, Qualcomm Incorporated, 3GPP TSG RAN WG1 #84b, pp. 1-8 (Year: 2016).*

(Continued)

*Primary Examiner* — Un C Cho
*Assistant Examiner* — Shah M Rahman
(74) *Attorney, Agent, or Firm* — Lee, Hong, Degerman, Kang & Waimey

(57) ABSTRACT

Disclosed are a method for transmitting and receiving a physical uplink control channel (PUCCH) between a terminal and a base station, and a device for supporting same. More specifically, disclosed are: a method for transmitting and receiving a PUCCH between a terminal and a base station through one or more resource elements included in (Continued)

one or more interlaces among interlaces of RB units in a frequency domain during one or two symbol periods unlike in a conventional method; and devices for supporting the same.

10 Claims, 18 Drawing Sheets

(52) U.S. Cl.
CPC ............ *H04L 5/0083* (2013.01); *H04L 27/26* (2013.01); *H04W 72/1284* (2013.01)

(58) Field of Classification Search
CPC ..... H04L 5/0083; H04L 5/0091; H04L 27/26; H04L 5/00; H04W 72/1284
See application file for complete search history.

(56) References Cited

U.S. PATENT DOCUMENTS

| | | | |
|---|---|---|---|
| 2015/0156638 | A1 | 6/2015 | Yerramalli et al. |
| 2016/0037352 | A1 | 2/2016 | Wei et al. |
| 2017/0019915 | A1* | 1/2017 | Nogami .................. H04L 5/001 |
| 2017/0094680 | A1* | 3/2017 | Patel .................. H04W 72/1284 |
| 2017/0164352 | A1* | 6/2017 | Yang ...................... H04L 5/0053 |
| 2017/0215206 | A1* | 7/2017 | Cheng .................. H04W 16/14 |
| 2017/0230972 | A1* | 8/2017 | Wang .................... H04L 5/0048 |
| 2017/0251464 | A1* | 8/2017 | Mukherjee ............ H04W 16/14 |
| 2017/0289993 | A1* | 10/2017 | Yerramalli ........ H04W 72/1284 |
| 2017/0302419 | A1* | 10/2017 | Liu ....................... H04W 48/12 |
| 2017/0366311 | A1* | 12/2017 | Iyer ...................... H04L 5/0007 |

OTHER PUBLICATIONS

Qualcomm, "R1-160888 PUCCH design details", Feb. 15-19, 2016, Qualcomm Incorporated, 3GPP TSG RAN WG1 #84, pp. 1-3 (Year: 2016).*
NTT, "R1-163172 PUCCH design for shortened TTI", Apr. 11-15, 2016, NTT DOCOMO, Inc., 3GPP TSG RAN WG1 Meeting #84bis, pp. 1-6 (Year: 2016).*
Ericsson, "U.S. Appl. No. 62/264,091" describing Uplink Control Channel Configuration for Unlicensed Carriers, Dec. 7, 2015, Telefonaktiebolaget LM Ericsson, Total pp. 28 (Year: 2015).*
PCT International Application No. PCT/KR2017/006297, Written Opinion of the International Searching Authority dated Sep. 12, 2017, 24 pages.
Huawei, et al., "PUCCH format for eLAA", 3GPP TSG RAN WG1 Meeting #84bis, R1-162584, Apr. 2016, 5 pages.
Sharp, "Channel design of shortened PUCCH", 3GPP TSG RAN WG1 Meeting #85, R1-165001, May 2016, 3 pages.
European Patent Office Application Serial No. 17813622.2, Search Report dated Dec. 3, 2019, 12 pages.
Ericsson, "Transmission of uplink control information on an LAA SCell in DL partial subframes", 3GPP TSG RAN WG1 Meeting #84bis, R1-163145, XP051080561, Apr. 2016, 3 pages.
Ericsson, "Transmission of Uplink Control Information on an LAA SCell in UL Subframes", 3GPP TSG RAN WG1 Meeting #84bis, R1-163144, XP051080560, Apr. 2016, 4 pages.
Ericsson, "PUCCH Design for Enhanced LAA", 3GPP TSG RAN WG1 Meeting #84, R1-160998, XP051054302, Feb. 2016, 4 pages.
Ericsson, "Uplink Resource Allocation Design for Enhanced LAA", 3GPP TSG RAN WG1 Meeting #84bis, R1-163138, XP051080554, Apr. 2016, 4 pages.

* cited by examiner

FIG. 9
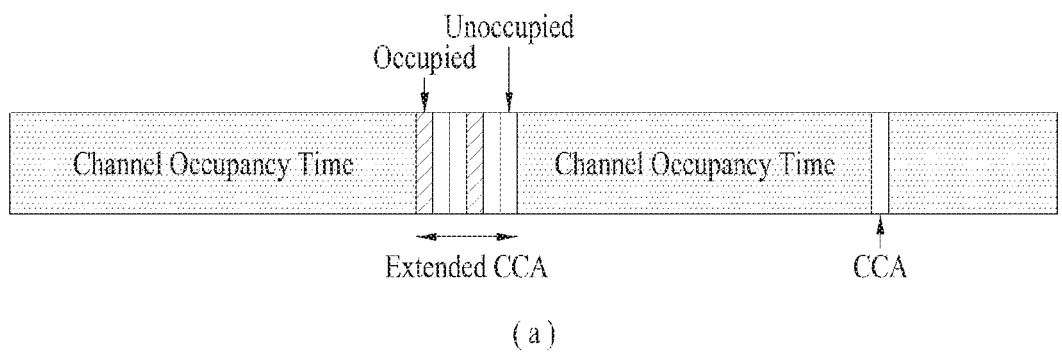
(a)
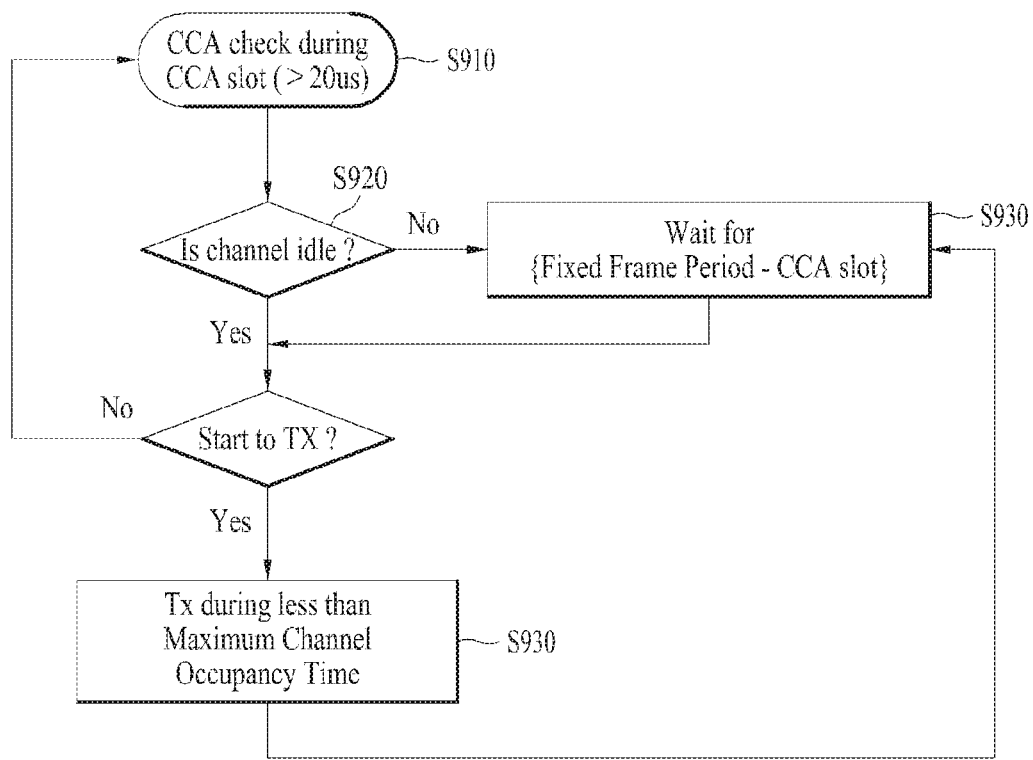
(b)

FIG. 24
Combination # 1 +
Combination # 3
Combination # 3 +
Combination # 3
FIG. 25
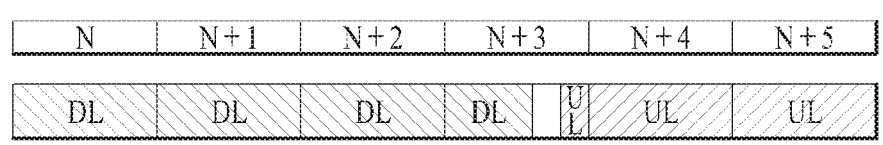

METHOD FOR TRANSMITTING AND RECEIVING PHYSICAL UPLINK CONTROL CHANNEL IN WIRELESS COMMUNICATION SYSTEM, AND DEVICE FOR SUPPORTING SAME

CROSS-REFERENCE TO RELATED APPLICATIONS

This application is the National Stage filing under 35 U.S.C. 371 of International Application No. PCT/KR2017/006297, filed on Jun. 16, 2017, which claims the benefit of U.S. Provisional Application No. 62/350,724, filed on Jun. 16, 2016, and 62/356,484, filed on Jun. 29, 2016, the contents of which are all hereby incorporated by reference herein in their entirety.

TECHNICAL FIELD

The following description relates to a wireless communication system, and particularly, to a method of transmitting and receiving a physical uplink control channel (PUCCH) between a terminal and a base station (BS) in a wireless communication system, and an apparatus supporting the same.

More particularly, the following description relates to a method of transmitting and receiving a PUCCH between a UE and a BS in one or more resource elements (REs) included in one or more of interlaces configured in units of resource blocks (RBs) in the frequency domain during one or two symbol periods, compared to the conventional technology, and an apparatus supporting the same.

BACKGROUND ART

Wireless access systems have been widely deployed to provide various types of communication services such as voice or data. In general, a wireless access system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, and a Single Carrier Frequency Division Multiple Access (SC-FDMA) system.

DISCLOSURE

Technical Problem

An aspect of the present invention is to provide a method and apparatus for transmitting and receiving a physical uplink control channel (PUCCH) between a terminal and a base station (BS).

Particularly, an aspect of the present invention is to provide a method and apparatus for transmitting and receiving a PUCCH between a terminal and a BS during a part of total symbol periods of a subframe (e.g., during one or two symbol periods), not during the total symbol periods of the subframe, compared to the conventional technology.

Further, another aspect of the present invention is to provide a method and apparatus for transmitting and receiving a PUCCH in one or more of interlaces configured in units of resource blocks (RBs) in consideration of a physical uplink shared channel (PUSCH) transmission scheme in an unlicensed band to which the present invention is applicable.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

The present invention provides a method and apparatus for transmitting and receiving a physical uplink control channel (PUCCH) between a terminal and a base station (BS) in a wireless communication system.

In an aspect of the present invention, a method of transmitting a PUCCH to a base station by a terminal in a wireless communication system includes determining a PUCCH resource for transmitting a PUCCH to be one or more resource elements (REs) included in one or more interlaces configured with resource blocks (RBs) apart from each other by the same spacing in a frequency domain in one or two symbols, and transmitting the PUCCH in the PUCCH resource.

In an aspect of the present invention, a terminal for transmitting a PUCCH to a base station in a wireless communication system includes a transmitter, and a processor configured to operate in connection to the transmitter. The processor is configured to determine a PUCCH resource for transmitting a PUCCH to be one or more REs included in one or more interlaces configured with RBs apart from each other by the same spacing in a frequency domain in one or two symbols, and to transmit the PUCCH in the PUCCH resource.

Herein, if the PUCCH resource is configured with one symbol, the one or more REs may be included in one interlace configured with RBs apart from each other by 10 RBs in the one symbol.

For example, the one or more REs may be configured to be total REs of the one interlace, or comb-type REs apart from each other by the same spacing among the total REs of the one interlace.

Particularly, if the one or more REs are configured to be comb-type REs apart from each other by the same spacing among the total REs of the one interlace, REs except for the comb-type REs among the total REs may include a sound reference signal (SRS) RE carrying an SRS.

In another example, the one or more REs may include one or more data REs carrying PUCCH data, and one or more reference signal (RS) REs carrying an RS.

Particularly, a ratio between the data REs and the RS REs may be equal in each RB included in the one interlace.

Further, if the PUCCH resource is configured with two symbols, the one or more REs may be included in one interlace configured independently on a symbol-by-symbol basis.

Or, if the PUCCH resource is configured with two symbols, the one or more REs may be included in one interlace configured with RBs apart from each other by 10 RBs in the two symbols, and an RB including the one or more REs may be configured to be different in each symbol.

Or if the PUCCH resource is configured with two symbols, the one or more REs may be included in one interlace configured with RBs apart from each other by 10 RBs in the two symbols, and transmission of the PUCCH in the PUCCH resource may include transmission of the PUCCH by applying an orthogonal cover code (OCC) on a symbol-by-symbol basis.

Additionally, the terminal according to the present invention may receive information indicating the PUCCH resource from the base station.

In another aspect of the present invention, a method of receiving a PUCCH from a terminal by a base station in a wireless communication system includes transmitting information indicating a PUCCH resource to the terminal, and receiving a PUCCH from the terminal in the PUCCH resource. The PUCCH resource includes one or more REs included in one or more interlaces configured with RBs apart from each other by the same spacing in a frequency domain in one or two symbols.

In another aspect of the present invention, a base station for receiving a PUCCH from a terminal in a wireless communication system includes a transmitter, a receiver, and a processor configured to operate in connection to the transmitter and the receiver. The processor is configured to transmit information indicating a PUCCH resource to the terminal, and to receive a PUCCH from the terminal in the PUCCH resource. The PUCCH resource includes one or more REs included in one or more interlaces configured with RBs apart from each other by the same spacing in a frequency domain in one or two symbols.

It is to be understood that both the foregoing general description and the following detailed description of the present disclosure are exemplary and explanatory and are intended to provide further explanation of the disclosure as claimed.

Advantageous Effects

As is apparent from the above description, the embodiments of the present invention have the following effects.

According to the present invention, a terminal and a base station (BS) can transmit and receive a PUCCH during some symbol period (e.g., in one or two symbols).

The PUCCH transmission and reception method is applicable for PUCCH transmission and reception in an unlicensed band.

Further, the PUCCH transmission and reception method is applicable for PUCCH transmission and reception in a system (e.g., a new RAT (NR) system) in which downlink signal transmission and reception, and uplink signal transmission and reception may take place during a predetermined time period (e.g., a subframe or slot).

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

BRIEF DESCRIPTION OF THE DRAWINGS

The accompanying drawings, which are included to provide a further understanding of the invention, provide embodiments of the present invention together with detail explanation. Yet, a technical characteristic of the present invention is not limited to a specific drawing. Characteristics disclosed in each of the drawings are combined with each other to configure a new embodiment. Reference numerals in each drawing correspond to structural elements.

FIG. 9 is a diagram illustrating an exemplary load based equipment (LBE) operation as one of the LBT operations;

FIG. 24 is a diagram illustrating exemplary overlap between PUCCH resources according to the present invention;

FIG. 25 is a diagram illustrating an exemplary subframe configuration applicable to a new RAT (NR) system or an LAA system according to an example of the present invention;

BEST MODE FOR CARRYING OUT THE INVENTION

Figure 1:
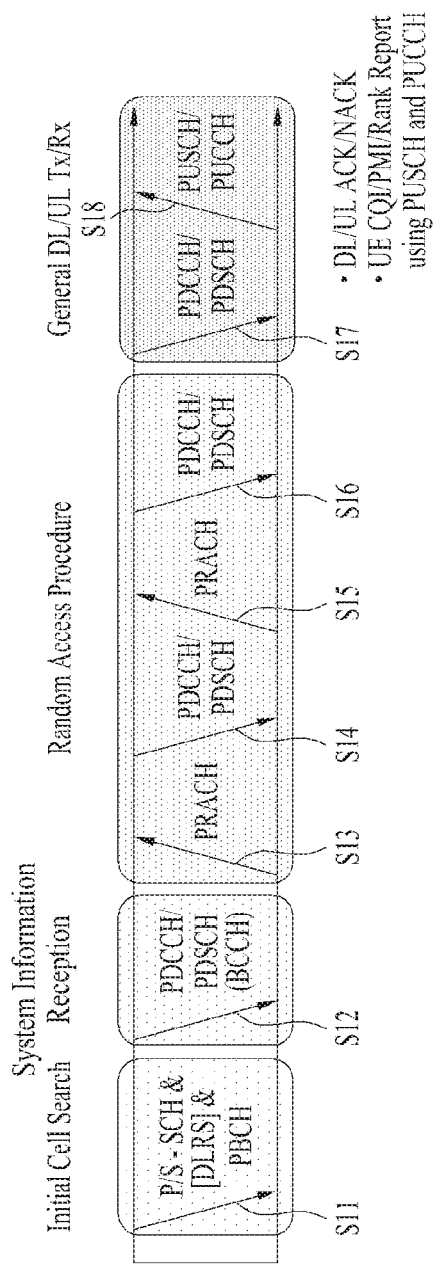
FIG. 1 is a diagram illustrating physical channels and a signal transmission method using the physical channels.

The embodiments of the present disclosure described below are combinations of elements and features of the present disclosure in specific forms. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or elements of any one embodiment may be included in another embodiment and may be replaced with corresponding constructions or features of another embodiment.

In the description of the attached drawings, a detailed description of known procedures or steps of the present disclosure will be avoided lest it should obscure the subject matter of the present disclosure. In addition, procedures or steps that could be understood to those skilled in the art will not be described either.

Throughout the specification, when a certain portion "includes" or "comprises" a certain component, this indicates that other components are not excluded and may be further included unless otherwise noted. The terms "unit", "-or/er" and "module" described in the specification indicate a unit for processing at least one function or operation, which may be implemented by hardware, software or a combination thereof. In addition, the terms "a or an", "one", "the" etc. may include a singular representation and a plural representation in the context of the present disclosure (more particularly, in the context of the following claims) unless indicated otherwise in the specification or unless context clearly indicates otherwise.

In the embodiments of the present disclosure, a description is mainly made of a data transmission and reception relationship between a Base Station (BS) and a User Equipment (UE). A BS refers to a terminal node of a network, which directly communicates with a UE. A specific operation described as being performed by the BS may be performed by an upper node of the BS.

Namely, it is apparent that, in a network comprised of a plurality of network nodes including a BS, various operations performed for communication with a UE may be performed by the BS, or network nodes other than the BS. The term 'BS' may be replaced with a fixed station, a Node B, an evolved Node B (eNode B or eNB), an Advanced Base Station (ABS), an access point, etc.

In the embodiments of the present disclosure, the term terminal may be replaced with a UE, a Mobile Station (MS), a Subscriber Station (SS), a Mobile Subscriber Station (MSS), a mobile terminal, an Advanced Mobile Station (AMS), etc.

A transmission end is a fixed and/or mobile node that provides a data service or a voice service and a reception end is a fixed and/or mobile node that receives a data service or a voice service. Therefore, a UE may serve as a transmission end and a BS may serve as a reception end, on an UpLink (UL). Likewise, the UE may serve as a reception end and the BS may serve as a transmission end, on a DownLink (DL).

The embodiments of the present disclosure may be supported by standard specifications disclosed for at least one of wireless access systems including an Institute of Electrical and Electronics Engineers (IEEE) 802.xx system, a 3rd Generation Partnership Project (3GPP) system, a 3GPP Long Term Evolution (LTE) system, and a 3GPP2 system. In particular, the embodiments of the present disclosure may be supported by the standard specifications, 3GPP TS 36.211, 3GPP TS 36.212, 3GPP TS 36.213, 3GPP TS 36.321 and 3GPP TS 36.331. That is, the steps or parts, which are not described to clearly reveal the technical idea of the present disclosure, in the embodiments of the present disclosure may be explained by the above standard specifications. All terms used in the embodiments of the present disclosure may be explained by the standard specifications.

Reference will now be made in detail to the embodiments of the present disclosure with reference to the accompanying drawings. The detailed description, which will be given below with reference to the accompanying drawings, is intended to explain exemplary embodiments of the present disclosure, rather than to show the only embodiments that can be implemented according to the disclosure.

The following detailed description includes specific terms in order to provide a thorough understanding of the present disclosure. However, it will be apparent to those skilled in the art that the specific terms may be replaced with other terms without departing the technical spirit and scope of the present disclosure.

For example, the term, TxOP may be used interchangeably with transmission period or Reserved Resource Period (RRP) in the same sense. Further, a Listen-Before-Talk (LBT) procedure may be performed for the same purpose as a carrier sensing procedure for determining whether a channel state is idle or busy, CCA (Clear Channel Assessment), CAP (Channel Access Procedure).

Hereinafter, 3GPP LTE/LTE-A systems are explained, which are examples of wireless access systems.

The embodiments of the present disclosure can be applied to various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc.

CDMA may be implemented as a radio technology such as Universal Terrestrial Radio Access (UTRA) or CDMA2000. TDMA may be implemented as a radio technology such as Global System for Mobile communications (GSM)/General packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved UTRA (E-UTRA), etc.

UTRA is a part of Universal Mobile Telecommunications System (UMTS). 3GPP LTE is a part of Evolved UMTS (E-UMTS) using E-UTRA, adopting OFDMA for DL and SC-FDMA for UL. LTE-Advanced (LTE-A) is an evolution of 3GPP LTE. While the embodiments of the present disclosure are described in the context of a 3GPP LTE/LTE-A system in order to clarify the technical features of the present disclosure, the present disclosure is also applicable to an IEEE 802.16e/m system, etc.

1. 3GPP LTE/LTE-A System

In a wireless access system, a UE receives information from an eNB on a DL and transmits information to the eNB on a UL. The information transmitted and received between the UE and the eNB includes general data information and various types of control information. There are many physical channels according to the types/usages of information transmitted and received between the eNB and the UE.

FIG. 1 illustrates physical channels and a general signal transmission method using the physical channels, which may be used in embodiments of the present disclosure.

When a UE is powered on or enters a new cell, the UE performs initial cell search (S11). The initial cell search involves acquisition of synchronization to an eNB. Specifically, the UE synchronizes its timing to the eNB and acquires information such as a cell Identifier (ID) by receiving a Primary Synchronization Channel (P-SCH) and a Secondary Synchronization Channel (S-SCH) from the eNB.

Then the UE may acquire information broadcast in the cell by receiving a Physical Broadcast Channel (PBCH) from the eNB.

During the initial cell search, the UE may monitor a DL channel state by receiving a Downlink Reference Signal (DL RS).

After the initial cell search, the UE may acquire more detailed system information by receiving a Physical Downlink Control Channel (PDCCH) and receiving a Physical Downlink Shared Channel (PDSCH) based on information of the PDCCH (S12).

To complete connection to the eNB, the UE may perform a random access procedure with the eNB (S13 to S16). In the random access procedure, the UE may transmit a preamble on a Physical Random Access Channel (PRACH) (S13) and may receive a PDCCH and a PDSCH associated with the PDCCH (S14). In the case of contention-based random access, the UE may additionally perform a contention resolution procedure including transmission of an additional PRACH (S15) and reception of a PDCCH signal and a PDSCH signal corresponding to the PDCCH signal (S16).

After the above procedure, the UE may receive a PDCCH and/or a PDSCH from the eNB (S17) and transmit a Physical Uplink Shared Channel (PUSCH) and/or a Physical Uplink Control Channel (PUCCH) to the eNB (S18), in a general UL/DL signal transmission procedure.

Control information that the UE transmits to the eNB is generically called Uplink Control Information (UCI). The UCI includes a Hybrid Automatic Repeat and reQuest Acknowledgement/Negative Acknowledgement (HARQ-ACK/NACK), a Scheduling Request (SR), a Channel Quality Indicator (CQI), a Precoding Matrix Index (PMI), a Rank Indicator (RI), etc.

In the LTE system, UCI is generally transmitted on a PUCCH periodically. However, if control information and traffic data should be transmitted simultaneously, the control information and traffic data may be transmitted on a PUSCH. In addition, the UCI may be transmitted aperiodically on the PUSCH, upon receipt of a request/command from a network.

Figure 2:
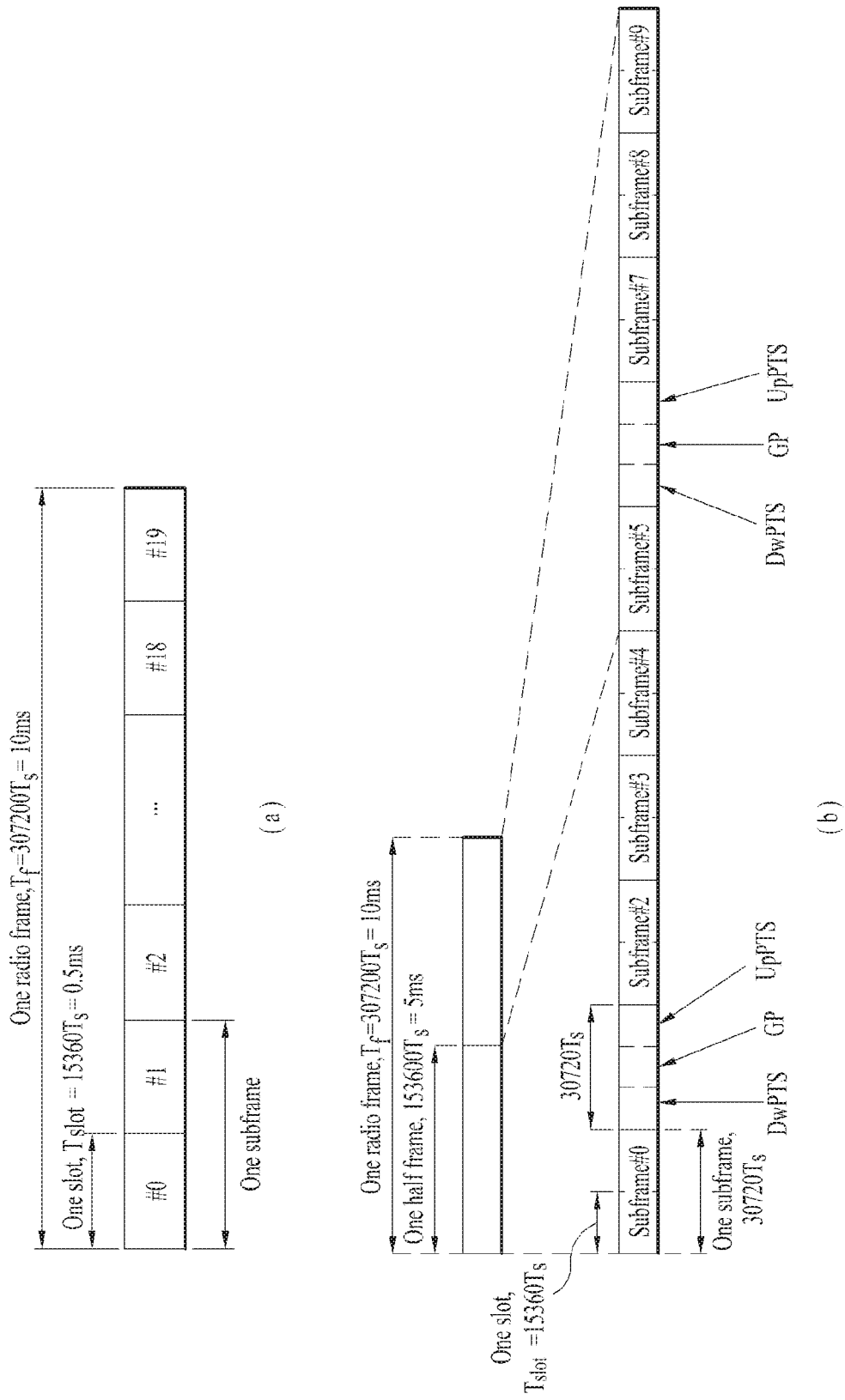
FIG. 2 is a diagram illustrating exemplary radio frame structures.

FIG. 2 illustrates exemplary radio frame structures used in embodiments of the present disclosure.

FIG. 2(a) illustrates frame structure type 1. Frame structure type 1 is applicable to both a full Frequency Division Duplex (FDD) system and a half FDD system.

One radio frame is 10 ms (Tf=307200·Ts) long, including equal-sized 20 slots indexed from 0 to 19. Each slot is 0.5 ms (Tslot=15360·Ts) long. One subframe includes two successive slots. An ith subframe includes 2ith and (2i+1)th slots. That is, a radio frame includes 10 subframes. A time required for transmitting one subframe is defined as a Transmission Time Interval (TTI). Ts is a sampling time given as Ts=1/(15 kHz×2048)=3.2552×10-8 (about 33 ns). One slot includes a plurality of Orthogonal Frequency Division Multiplexing (OFDM) symbols or SC-FDMA symbols in the time domain by a plurality of Resource Blocks (RBs) in the frequency domain.

A slot includes a plurality of OFDM symbols in the time domain. Since OFDMA is adopted for DL in the 3GPP LTE system, one OFDM symbol represents one symbol period. An OFDM symbol may be called an SC-FDMA symbol or symbol period. An RB is a resource allocation unit including a plurality of contiguous subcarriers in one slot.

In a full FDD system, each of 10 subframes may be used simultaneously for DL transmission and UL transmission during a 10-ms duration. The DL transmission and the UL transmission are distinguished by frequency. On the other hand, a UE cannot perform transmission and reception simultaneously in a half FDD system.

The above radio frame structure is purely exemplary. Thus, the number of subframes in a radio frame, the number of slots in a subframe, and the number of OFDM symbols in a slot may be changed.

FIG. 2(b) illustrates frame structure type 2. Frame structure type 2 is applied to a Time Division Duplex (TDD) system. One radio frame is 10 ms (Tf=307200·Ts) long, including two half-frames each having a length of 5 ms (=153600·Ts) long. Each half-frame includes five subframes each being 1 ms (=30720·Ts) long. An ith subframe includes 2ith and (2i+1)th slots each having a length of 0.5 ms (Tslot=15360·Ts). Ts is a sampling time given as Ts=1/(15 kHz×2048)=3.2552×10-8 (about 33 ns).

A type-2 frame includes a special subframe having three fields, Downlink Pilot Time Slot (DwPTS), Guard Period (GP), and Uplink Pilot Time Slot (UpPTS). The DwPTS is used for initial cell search, synchronization, or channel estimation at a UE, and the UpPTS is used for channel estimation and UL transmission synchronization with a UE at an eNB. The GP is used to cancel UL interference between a UL and a DL, caused by the multi-path delay of a DL signal.

Table 1 below lists special subframe configurations (DwPTS/GP/UpPTS lengths).

TABLE 1

| | | Normal cyclic prefix in downlink | | Extended cyclic prefix in downlink | | |
|---|---|---|---|---|---|---|
| | | UpPTS | | | UpPTS | |
| | | Normal | Extended | | | |
| Special subframe configuration | DwPTS | cyclic prefix in uplink | cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |

TABLE 1-continued

| | | Normal cyclic prefix in downlink | | Extended cyclic prefix in downlink | | |
|---|---|---|---|---|---|---|
| | | UpPTS | | | UpPTS | |
| | | Normal | Extended | | | |
| Special subframe configuration | DwPTS | cyclic prefix in uplink | cyclic prefix in uplink | DwPTS | Normal cyclic prefix in uplink | Extended cyclic prefix in uplink |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |

Figure 3:
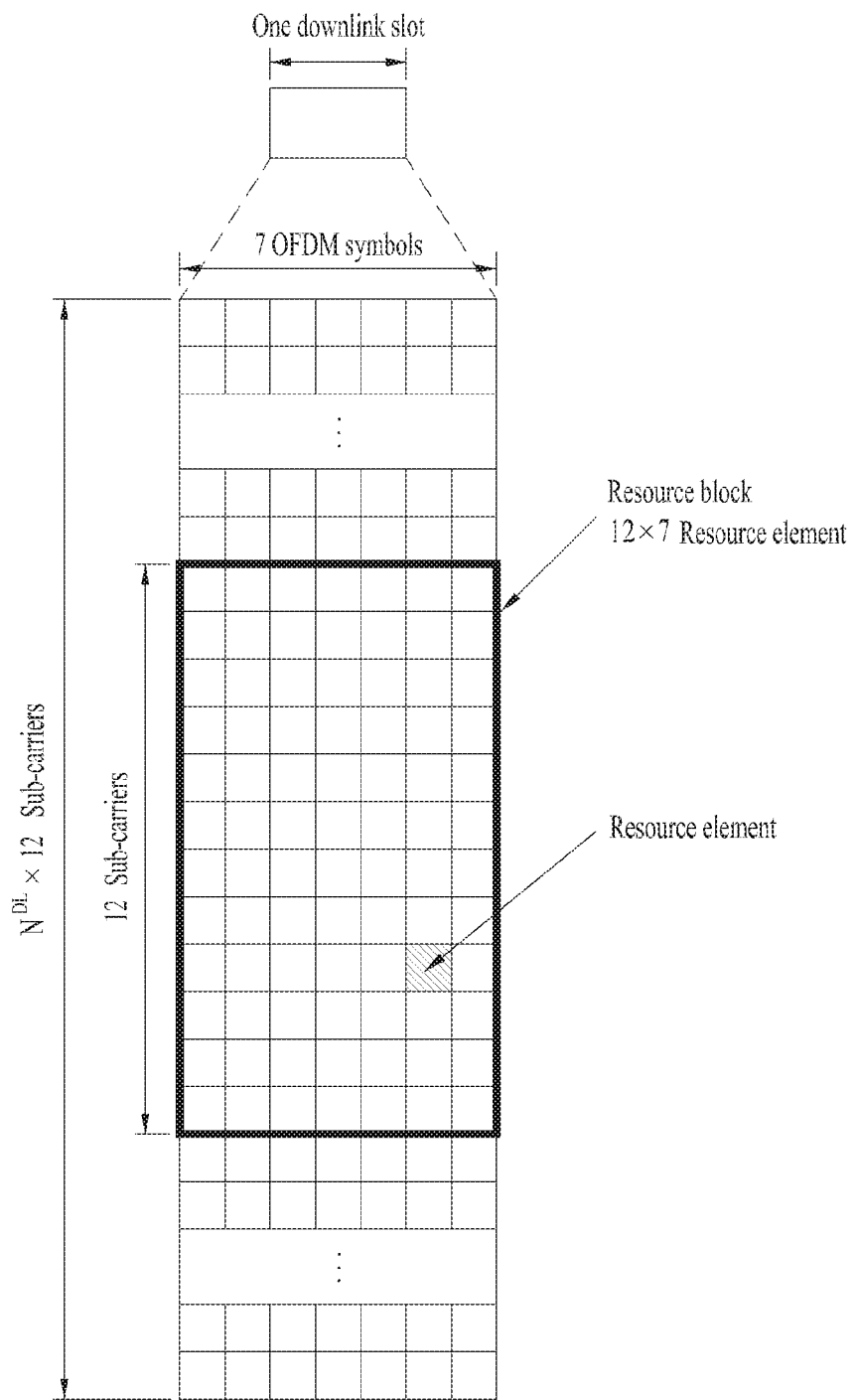
FIG. 3 is a diagram illustrating an exemplary resource grid for the duration of a downlink slot.

FIG. 3 illustrates an exemplary structure of a DL resource grid for the duration of one DL slot, which may be used in embodiments of the present disclosure.

Referring to FIG. 3, a DL slot includes a plurality of OFDM symbols in the time domain. One DL slot includes 7 OFDM symbols in the time domain and an RB includes 12 subcarriers in the frequency domain, to which the present disclosure is not limited.

Each element of the resource grid is referred to as a Resource Element (RE). An RB includes 12×7 REs. The number of RBs in a DL slot, NDL depends on a DL transmission bandwidth. The structure of the uplink slot may be the same as the structure of the downlink slot.

Figure 4:
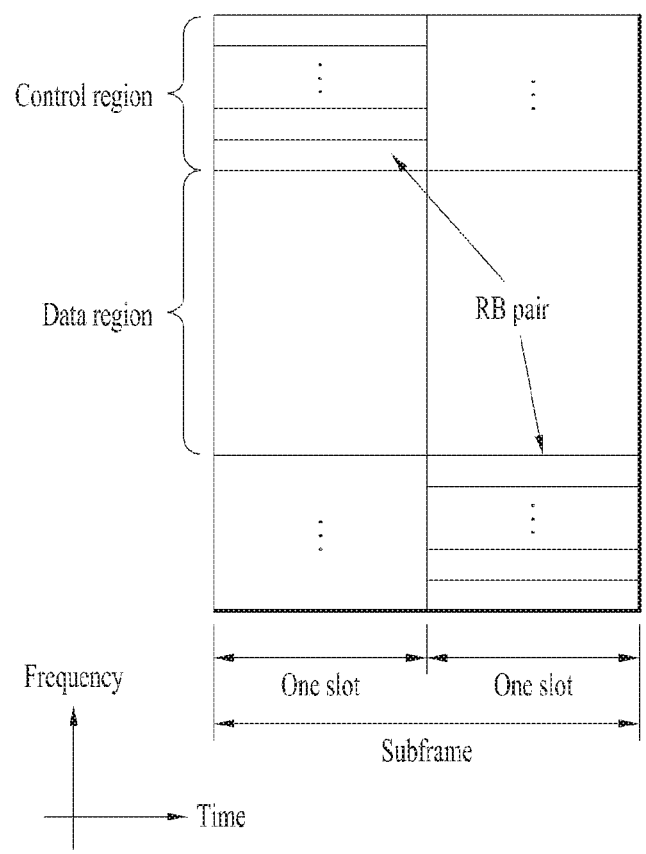
FIG. 4 is a diagram illustrating an exemplary structure of an uplink subframe.

FIG. 4 illustrates a structure of a UL subframe which may be used in embodiments of the present disclosure.

Referring to FIG. 4, a UL subframe may be divided into a control region and a data region in the frequency domain. A PUCCH carrying UCI is allocated to the control region and a PUSCH carrying user data is allocated to the data region. To maintain a single carrier property, a UE does not transmit a PUCCH and a PUSCH simultaneously. A pair of RBs in a subframe are allocated to a PUCCH for a UE. The RBs of the RB pair occupy different subcarriers in two slots. Thus it is said that the RB pair frequency-hops over a slot boundary.

Figure 5:
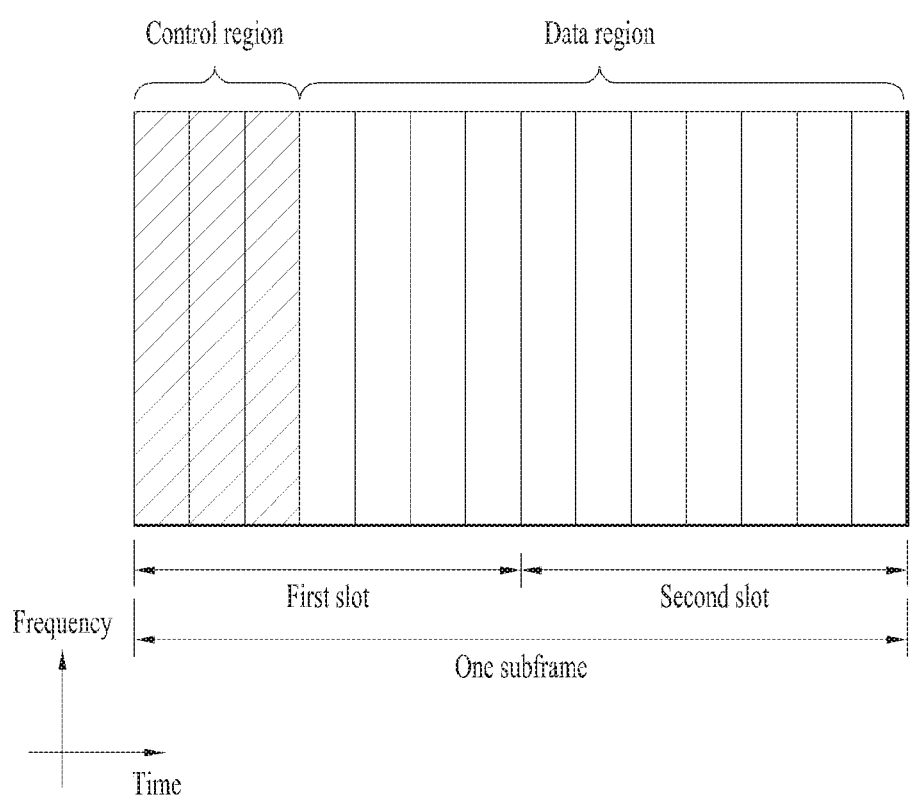
FIG. 5 is a diagram illustrating an exemplary structure of a downlink subframe.

FIG. 5 illustrates a structure of a DL subframe that may be used in embodiments of the present disclosure.

Referring to FIG. 5, up to three OFDM symbols of a DL subframe, starting from OFDM symbol 0 are used as a control region to which control channels are allocated and the other OFDM symbols of the DL subframe are used as a data region to which a PDSCH is allocated. DL control channels defined for the 3GPP LTE system include a Physical Control Format Indicator Channel (PCFICH), a PDCCH, and a Physical Hybrid ARQ Indicator Channel (PHICH).

The PCFICH is transmitted in the first OFDM symbol of a subframe, carrying information about the number of 01-DM symbols used for transmission of control channels (i.e., the size of the control region) in the subframe. The PHICH is a response channel to a UL transmission, delivering an HARQ ACK/NACK signal. Control information carried on the PDCCH is called Downlink Control Information (DCI). The DCI transports UL resource assignment information, DL resource assignment information, or UL Transmission (Tx) power control commands for a UE group.

2. LTE-U System
2.1 LTE-U System Configuration

Hereinafter, methods for transmitting and receiving data in a CA environment of an LTE-A band corresponding to a licensed band and an unlicensed band will be described. In the embodiments of the present disclosure, an LTE-U system means an LTE system that supports such a CA status of a licensed band and an unlicensed band. A WiFi band or Bluetooth (BT) band may be used as the unlicensed band. LTE-A system operating on an unlicensed band is referred to as LAA (Licensed Assisted Access) and the LAA may correspond to a scheme of performing data transmission/reception in an unlicensed band using a combination with a licensed band.

Figure 6:
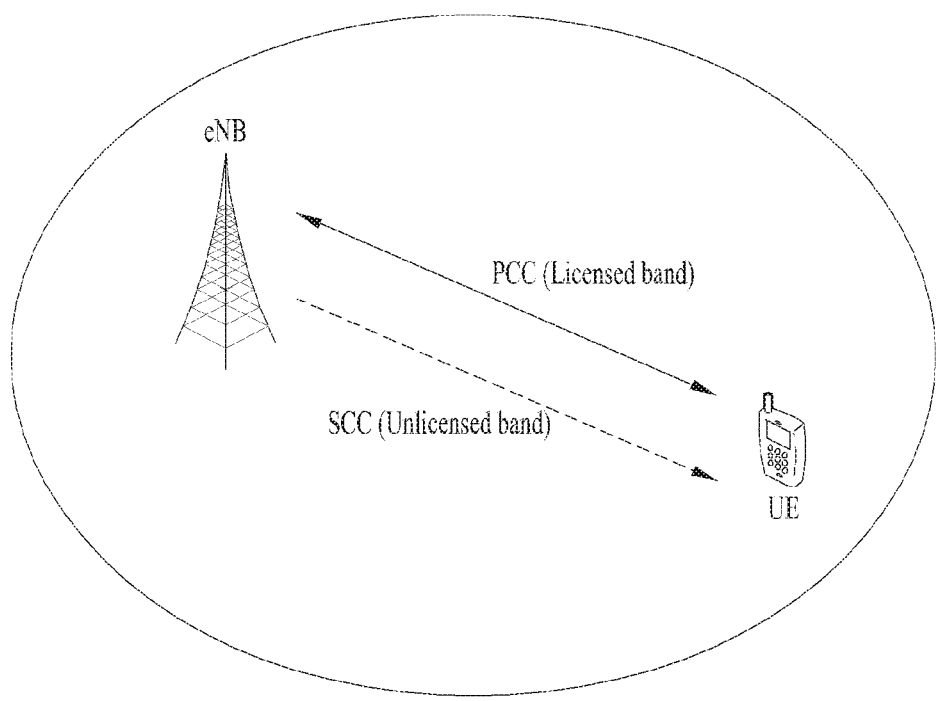
FIG. 6 is a diagram illustrating an exemplary carrier aggregation (CA) environment supported in a long term evolution-unlicensed (LTE-U) system.

FIG. 6 illustrates an example of a CA environment supported in an LTE-U system.

Hereinafter, for convenience of description, it is assumed that a UE is configured to perform wireless communication in each of a licensed band and an unlicensed band by using two CCs. The methods which will be described hereinafter may be applied to even a case where three or more CCs are configured for a UE.

In the embodiments of the present disclosure, it is assumed that a carrier of the licensed band may be a primary CC (PCC or PCell), and a carrier of the unlicensed band may be a secondary CC (SCC or SCell). However, the embodiments of the present disclosure may be applied to even a case where a plurality of licensed bands and a plurality of unlicensed bands are used in a carrier aggregation method. Also, the methods suggested in the present disclosure may be applied to even a 3GPP LTE system and another system.

In FIG. 6, one eNB supports both a licensed band and an unlicensed band. That is, the UE may transmit and receive control information and data through the PCC which is a licensed band, and may also transmit and receive control information and data through the SCC which is an unlicensed band. However, the status shown in FIG. 6 is only example, and the embodiments of the present disclosure may be applied to even a CA environment that one UE accesses a plurality of eNBs.

For example, the UE may configure a macro eNB (M-eNB) and a PCell, and may configure a small eNB (S-eNB) and an SCell. At this time, the macro eNB and the small eNB may be connected with each other through a backhaul network.

In the embodiments of the present disclosure, the unlicensed band may be operated in a contention-based random access method. At this time, the eNB that supports the unlicensed band may perform a Carrier Sensing (CS) procedure prior to data transmission and reception. The CS procedure determines whether a corresponding band is reserved by another entity.

For example, the eNB of the SCell checks whether a current channel is busy or idle. If it is determined that the corresponding band is idle state, the eNB may transmit a scheduling grant to the UE to allocate a resource through (E)PDCCH of the PCell in case of a cross carrier scheduling mode and through PDCCH of the SCell in case of a self-scheduling mode, and may try data transmission and reception.

At this time, the eNB may configure a TxOP including N consecutive subframes. In this case, a value of N and a use of the N subframes may previously be notified from the eNB to the UE through higher layer signaling through the PCell or through a physical control channel or physical data channel.

2.2 Carrier Sensing (CS) Procedure

In embodiments of the present disclosure, a CS procedure may be called a Clear Channel Assessment (CCA) procedure. In the CCA procedure, it may be determined whether a channel is busy or idle based on a predetermined CCA threshold or a CCA threshold configured by higher-layer signaling. For example, if energy higher than the CCA threshold is detected in an unlicensed band, SCell, it may be determined that the channel is busy or idle. If the channel is determined to be idle, an eNB may start signal transmission in the SCell. This procedure may be referred to as LBT.

Figure 7:
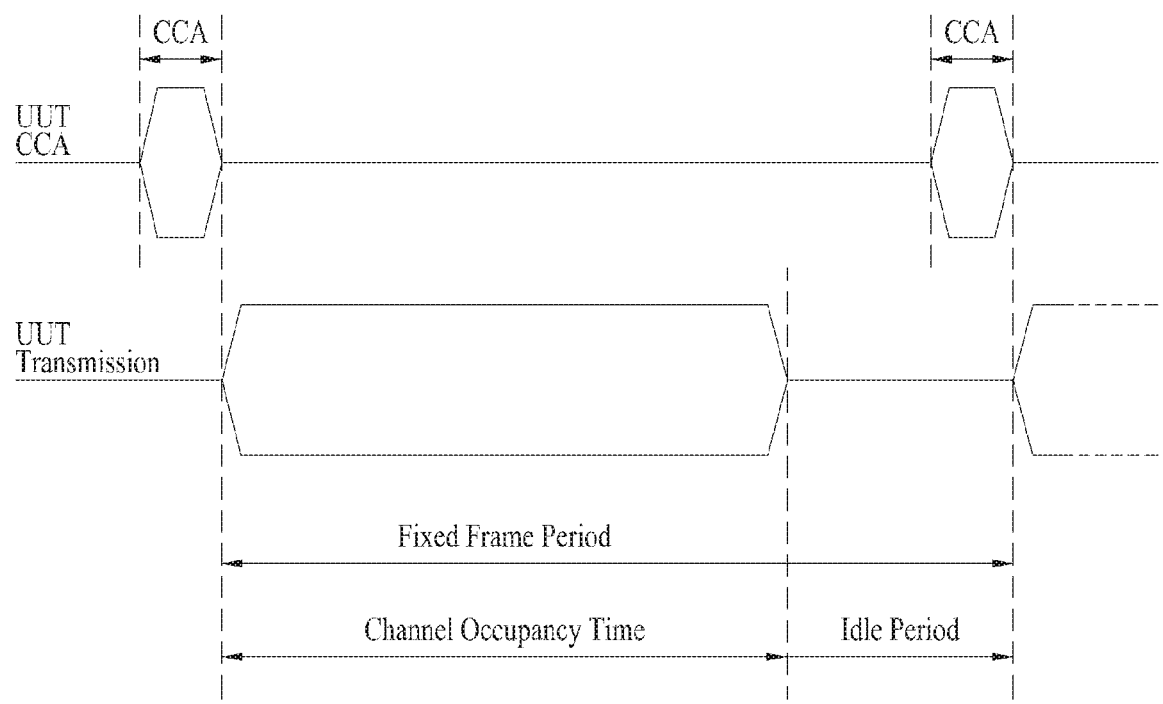
FIG. 7 is a diagram illustrating an exemplary frame based equipment (FBE) operation as one of listen-before-talk (LBT) operations.

FIG. 7 is a view illustrating an exemplary Frame Based Equipment (FBE) operation as one of LBT operations.

The European Telecommunication Standards Institute (ETSI) regulation (EN 301 893 V1.7.1) defines two LBT operations, Frame Based Equipment (FBE) and Load Based Equipment (LBE). In FBE, one fixed frame is comprised of a channel occupancy time (e.g., 1 to 10 ms) being a time period during which a communication node succeeding in channel access may continue transmission, and an idle period being at least 5% of the channel occupancy time, and CCA is defined as an operation for monitoring a channel during a CCA slot (at least 20 μs) at the end of the idle period.

A communication node periodically performs CCA on a per-fixed frame basis. If the channel is unoccupied, the communication node transmits data during the channel occupancy time. On the contrary, if the channel is occupied, the communication node defers the transmission and waits until the CCA slot of the next period.

Figure 8:
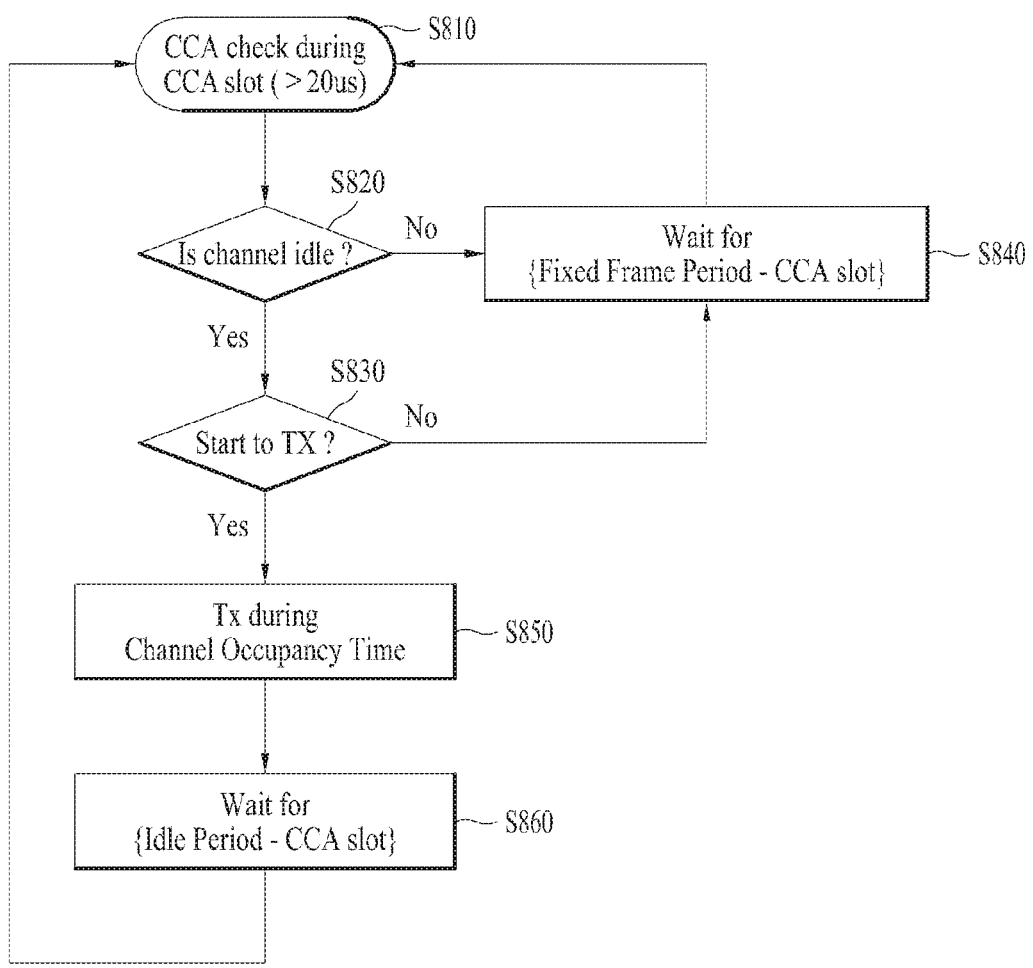
FIG. 8 is a block diagram illustrating the FBE operation.

FIG. 8 is a block diagram illustrating the FBE operation.

Referring to FIG. 8, a communication node (i.e., eNB) managing an SCell performs CCA during a CCA slot [S810]. If the channel is idle [S820], the communication node performs data transmission (Tx) [S830]. If the channel is busy, the communication node waits for a time period calculated by subtracting the CCA slot from a fixed frame period, and then resumes CCA [S840].

The communication node transmits data during the channel occupancy time [S850]. Upon completion of the data transmission, the communication node waits for a time period calculated by subtracting the CCA slot from the idle period [S860], and then resumes CCA [S810]. If the channel is idle but the communication node has no transmission data, the communication node waits for the time period calculated by subtracting the CCA slot from the fixed frame period [S840], and then resumes CCA [S810].

FIG. 9 is a view illustrating an exemplary LBE operation as one of the LBT operations.

Referring to FIG. 9(a), in LBE, the communication node first sets q (q∈{4, 5, . . . , 32}) and then performs CCA during one CCA slot.

FIG. 9(b) is a block diagram illustrating the LBE operation. The LBE operation will be described with reference to FIG. 9(b).

The communication node may perform CCA during a CCA slot [S910]. If the channel is unoccupied in a first CCA slot [S920], the communication node may transmit data by securing a time period of up to (13/32)q ms [S930].

On the contrary, if the channel is occupied in the first CCA slot, the communication node selects N (N ∈ {1, 2, . . . , q}) arbitrarily (i.e., randomly) and stores the selected N value as an initial count. Then, the communication node senses a channel state on a CCA slot basis. Each time the channel is unoccupied in one specific CCA slot, the communication node decrements the count by 1. If the count is 0, the communication node may transmit data by securing a time period of up to (13/32)q ms [S940].

2.3 Discontinuous Transmission in DL

When discontinuous transmission is performed on an unlicensed carrier having a limited maximum transmission period, the discontinuous transmission may influence on several functions necessary for performing an operation of LTE system. The several functions can be supported by one or more signals transmitted at a starting part of discontinuous LAA DL transmission. The functions supported by the signals include such a function as AGC configuration, channel reservation, and the like.

When a signal is transmitted by an LAA node, channel reservation has a meaning of transmitting signals via channels, which are occupied to transmit a signal to other nodes, after channel access is performed via a successful LBT operation.

The functions, which are supported by one or more signals necessary for performing an LAA operation including discontinuous DL transmission, include a function for detecting LAA DL transmission transmitted by a UE and a function for synchronizing frequency and time. In this case, the requirement of the functions does not mean that other available functions are excluded. The functions can be supported by other methods.

2.3.1 Time and Frequency Synchronization

A design target recommended by LAA system is to support a UE to make the UE obtain time and frequency synchronization via a discovery signal for measuring RRM (radio resource management) and each of reference signals included in DL transmission bursts, or a combination thereof. The discovery signal for measuring RRM transmitted from a serving cell can be used for obtaining coarse time or frequency synchronization.

2.3.2 DL Transmission Timing

When a DL LAA is designed, it may follow a CA timing relation between serving cells combined by CA, which is defined in LTE-A system (Rel-12 or earlier), for subframe boundary adjustment. Yet, it does not mean that a base station starts DL transmission only at a subframe boundary. Although all OFDM symbols are unavailable in a subframe, LAA system can support PDSCH transmission according to a result of an LBT operation. In this case, it is required to support transmission of control information necessary for performing the PDSCH transmission.

2.4 Measuring and Reporting RRM

LTE-A system can transmit a discovery signal at a start point for supporting RRM functions including a function for detecting a cell. In this case, the discovery signal can be referred to as a discovery reference signal (DRS). In order to support the RRM functions for LAA, the discovery signal of the LTE-A system and transmission/reception functions of the discovery signal can be applied in a manner of being changed.

2.4.1 Discovery Reference Signal (DRS)

A DRS of LTE-A system is designed to support on/off operations of a small cell. In this case, off small cells correspond to a state that most of functions are turned off except a periodic transmission of a DRS. DRSs are transmitted at a DRS transmission occasion with a period of 40, 80, or 160 ms. A DMTC (discovery measurement timing configuration) corresponds to a time period capable of anticipating a DRS received by a UE. The DRS transmission occasion may occur at any point in the DMTC. A UE can anticipate that a DRS is continuously transmitted from a cell allocated to the UE with a corresponding interval.

If a DRS of LTE-A system is used in LAA system, it may bring new constraints. For example, although transmission of a DRS such as a very short control transmission without LBT can be permitted in several regions, a short control transmission without LBT is not permitted in other several regions. Hence, a DRS transmission in the LAA system may become a target of LBT.

When a DRS is transmitted, if LBT is applied to the DRS, similar to a DRS transmitted in LTE-A system, the DRS may not be transmitted by a periodic scheme. In particular, it may consider two schemes described in the following to transmit a DRS in the LAA system.

As a first scheme, a DRS is transmitted at a fixed position only in a DMTC configured on the basis of a condition of LBT.

As a second scheme, a DRS transmission is permitted at one or more different time positions in a DMTC configured on the basis of a condition of LBT.

As a different aspect of the second scheme, the number of time positions can be restricted to one time position in a subframe. If it is more profitable, DRS transmission can be permitted at the outside of a configured DMTC as well as DRS transmission performed in the DMTC.

Figure 10:
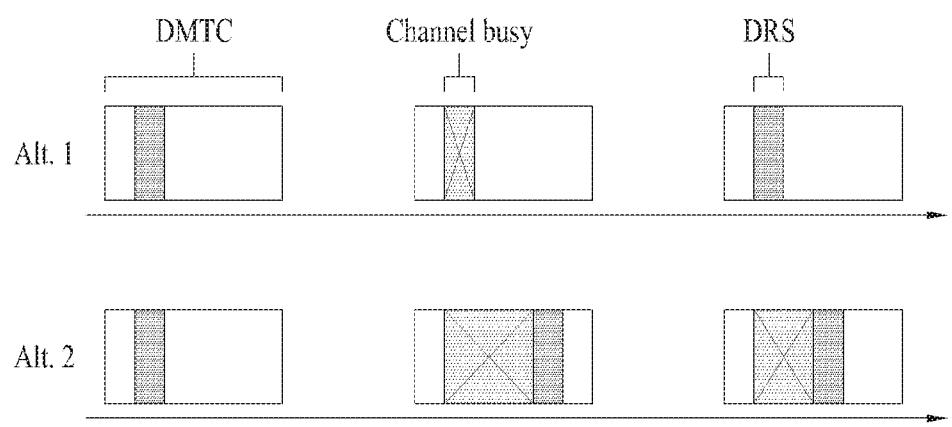
FIG. 10 is a diagram illustrating methods of transmitting a discovery reference signal (DRS) supported in a licensed assisted access (LAA) system.

FIG. 10 is a diagram for explaining DRS transmission methods supported by LAA system.

Referring to FIG. 10, the upper part of FIG. 10 shows the aforementioned first scheme for transmitting a DRS and the bottom part of FIG. 10 shows the aforementioned second scheme for transmitting a DRS. In particular, in case of the first scheme, a UE can receive a DRS at a position determined in a DMTC period only. On the contrary, in case of the second scheme, a UE can receive a DRS at a random position in a DMTC period.

In LTE-A system, when a UE performs RRM measurement based on DRS transmission, the UE can perform single RRM measurement based on a plurality of DRS occasions. In case of using a DRS in LAA system, due to the constraint of LBT, it is difficult to guarantee that the DRS is transmitted at a specific position. Even though a DRS is not actually transmitted from a base station, if a UE assumes that the DRS exists, quality of an RRM measurement result reported by the UE can be deteriorated. Hence, when LAA DRS is designed, it is necessary to permit the existence of a DRS to be detected in a single DRS occasion. By doing so, it may be able to make the UE combine the existence of the DRS with RRM measurement, which is performed on successfully detected DRS occasions only.

Signals including a DRS do not guarantee DRS transmissions adjacent in time. In particular, if there is no data transmission in subframes accompanied with a DRS, there may exist OFDM symbols in which a physical signal is not transmitted. While operating in an unlicensed band, other nodes may sense that a corresponding channel is in an idle state during a silence period between DRS transmissions. In order to avoid the abovementioned problem, it is preferable that transmission bursts including a DRS signal are configured by adjacent 01-DM symbols in which several signals are transmitted.

2.5 Channel Access Procedure and Contention Window Adjustment Procedure

In the following, the aforementioned channel access procedure and the contention window adjustment procedure are explained in the aspect of a transmission node.

Figure 11:
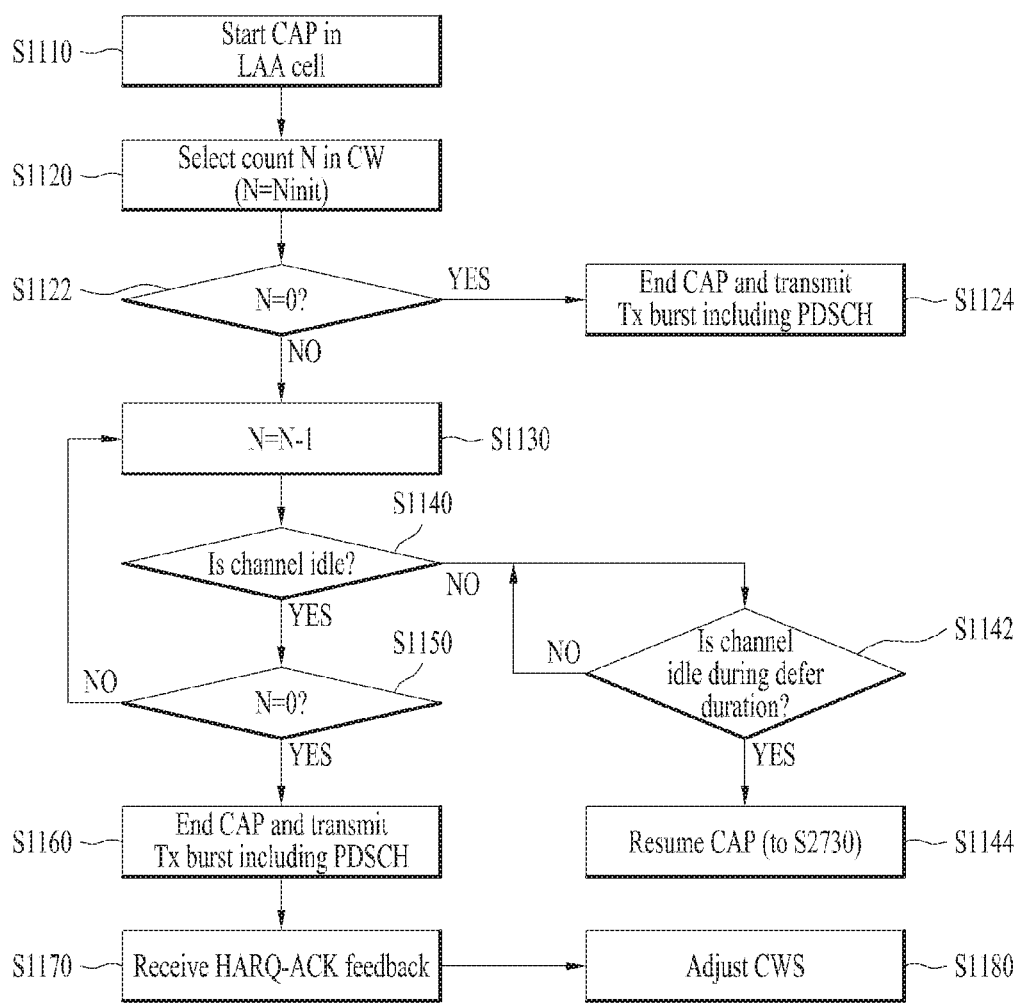
FIG. 11 is a diagram illustrating a channel access procedure (CAP) and contention window adjustment (CWA)

FIG. 11 is a flowchart for explaining CAP and CWA.

In order for an LTE transmission node (e.g., a base station) to operate in LAA Scell(s) corresponding to an unlicensed band cell for DL transmission, it may initiate a channel access procedure (CAP) [S1110].

The base station can randomly select a back-off counter N from a contention window (CW). In this case, the N is configured by an initial value Ninit [S1120]. The Ninit is randomly selected from among values ranging from 0 to $CW_p$.

Subsequently, if the back-off counter value (N) corresponds to 0 [S1122], the base station terminates the CAP and performs Tx burst transmission including PSCH [S1124]. On the contrary, if the back-off value is not 0, the base station reduces the back-off counter value by 1 [S1130].

The base station checks whether or not a channel of the LAA Scell(s) is in an idle state [S1140]. If the channel is in the idle state, the base station checks whether or not the back-off value corresponds to 0 [S1150]. The base station repeatedly checks whether or not the channel is in the idle state until the back-off value becomes 0 while reducing the back-off counter value by 1.

In the step S1140, if the channel is not in the idle state i.e., if the channel is in a busy state, the base station checks whether or not the channel is in the idle state during a defer duration (more than 15 usec) longer than a slot duration (e.g., 9 usec) [S1142]. If the channel is in the idle state during the defer duration, the base station can resume the CAP [S1144]. For example, when the back-off counter value Ninit corresponds to 10, if the channel state is determined as busy after the back-off counter value is reduced to 5, the base station senses the channel during the defer duration and determines whether or not the channel is in the idle state. In this case, if the channel is in the idle state during the defer duration, the base station performs the CAP again from the back-off counter value 5 (or, from the back-off counter value 4 by reducing the value by 1) rather than configures the back-off counter value Ninit. On the contrary, if the channel is in the busy state during the defer duration, the base station performs the step S1142 again to check whether or not the channel is in the idle state during a new defer duration.

Referring back to FIG. 11, the base station checks whether or not the back-off counter value (N) becomes 0 [S1150]. If the back-off counter value (N) becomes 0, the base station terminates the CAP and may be able to transmit a Tx burst including PDSCH.

The base station can receive HARQ-ACK information from a UE in response to the Tx burst [S1170]. The base station can adjust a CWS (contention window size) based on the HARQ-ACK information received from the UE [S1180].

In the step S1180, as a method of adjusting the CWS, the base station can adjust the CWS based on HARQ-ACK information on a first subframe of a most recently transmitted Tx burst (i.e., a start subframe of the Tx burst).

In this case, the base station can set an initial CW to each priority class before the CWP is performed. Subsequently, if a probability that HARQ-ACK values corresponding to PDSCH transmitted in a reference subframe are determined as NACK is equal to or greater than 80%, the base station increases CW values set to each priority class to a next higher priority.

In the step S1160, PDSCH can be assigned by a self-carrier scheduling scheme or a cross-carrier scheduling scheme. If the PDSCH is assigned by the self-carrier scheduling scheme, the base station counts DTX, NACK/DTX, or ANY state among the HARQ-ACK information fed back by the UE as NACK. If the PDSCH is assigned by the cross-carrier scheduling scheme, the base station counts the NACK/DTX and the ANY states as NACK and does not count the DTX state as NACK among the HARQ-ACK information fed back by the UE.

If bundling is performed over M (M>=2) number of subframes and bundled HARQ-ACK information is received, the base station may consider the bundled HARQ-ACK information as M number of HARQ-ACK responses. In this case, it is preferable that a reference subframe is included in the M number of bundled subframes.

2.6. Channel Access Priory Class

TABLE 2

| Channel Access Priority Class (p) | $m_p$ | $CW_{min,p}$ | $CW_{max,p}$ | $T_{m\ cot,p}$ | allowed $CW_p$ sizes |
|---|---|---|---|---|---|
| 1 | 1 | 3 | 7 | 2 ms | {3, 7} |
| 2 | 1 | 7 | 15 | 3 ms | {7, 15} |
| 3 | 3 | 15 | 63 | 8 or 10 ms | {15, 31, 63} |
| 4 | 7 | 15 | 1023 | 8 or 10 ms | {15, 31, 63, 127, 255, 511, 1023} |

As shown in Table 2, in Rel-13 LAA system, 4 channel access priority classes are defined in total. And, a length of a defer period, a CWS, MCOT (maximum channel occupancy time), and the like are defined according to each of the channel access priority classes. Hence, when an eNB transmits a downlink signal via an unlicensed band, the eNB performs random backoff by utilizing LBT parameters determined according to a channel access priority class and may be then able to access a channel during limited maximum transmission time only after the random backoff is completed.

For example, in case of the channel access priority class 1/2/3/4, the maximum channel occupancy time (MCOT) is determined by 2/3/8/8 ms. The maximum channel occupancy time (MCOT) is determined by 2/3/10/10 ms in environment where other RAT such as Wi-Fi does not exists (e.g., by level of regulation).

As shown in Table 2, a set of CWSs capable of being configured according to a class is defined. One of points different from Wi-Fi system is in that a different backoff counter value is not defined according to a channel access priority class and LBT is performed using a single backoff counter value (this is referred to as single engine LBT).

For example, when an eNB intends to access a channel via an LBT operation of class 3, since CWmin (=15) is configured as an initial CWS, the eNB performs random backoff by randomly selecting an integer from among numbers ranging from 0 to 15. If a backoff counter value becomes 0, the eNB starts DL Tx and randomly selects a new backoff counter for a next Tx burst after the DL Tx burst is completed. In this case, if an event for increasing a CWS is triggered, the eNB increases a size of the CWS to 31 corresponding to a next size, randomly selects an integer from among numbers ranging from 0 to 31, and performs random backoff.

In this case, when a CWS of the class 3 is increased, CWSs of all classes are increased as well. In particular, if the CW of the class 3 becomes 31, a CWS of a class 1/2/4 becomes 7/15/31. If an event for decreasing a CWS is triggered, CWS values of all classes are initialized by CWmin irrespective of a CWS value of the triggering timing.

2.7. Subframe Structure Applicable to LAA System

Figure 12:
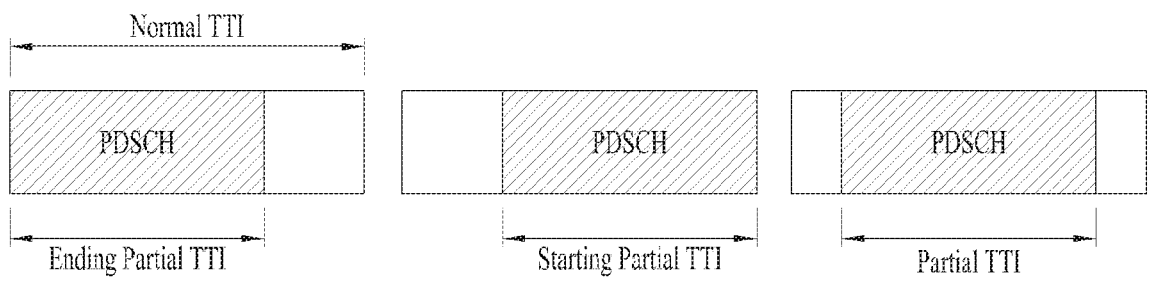
FIG. 12 is a diagram illustrating a partial transmission time interval (TTI) or a partial subframe, which is applicable to the present invention.

FIG. 12 is a diagram illustrating a partial TTI or a partial subframe applicable to the present invention.

In Rel-13 LAA system, MCOT is utilized as much as possible when DL Tx burst is transmitted. In order to support consecutive transmission, a partial TTI, which is defined as DwPTS, is introduced. The partial TTI (or partial subframe) corresponds to a section in which a signal is transmitted as much as a length shorter than a legacy TTI (e.g., 1 ms) when PDSCH is transmitted.

In the present invention, for clarity, a starting partial TTI or a starting partial subframe corresponds to a form that a part of symbols positioned at the fore part of a subframe are emptied out. An ending partial TTI or an ending partial subframe corresponds to a form that a part of symbols positioned at the rear part of a subframe are emptied out. (On the contrary, an intact TTI is referred to as a normal TTI or a full TTI.)

FIG. 12 illustrates various types of the aforementioned partial TTI. The first drawing of FIG. 12 illustrates an ending partial TTI (or subframe) and the second drawing illustrates a starting partial TTI (or subframe). The third drawing of FIG. 12 illustrates a partial TTI (or subframe) that a part of symbols positioned at the fore part and the rear part of a subframe are emptied out. In this case, when signal transmission is excluded from a normal TTI, a time section during which the signal transmission is excluded is referred to as a transmission gap (TX gap).

Although the present invention is explained on the basis of a DL operation in FIG. 12, the present invention can also be identically applied to a UL operation. For example, a partial TTI structure shown in FIG. 12 can be applied to a form of transmitting PUCCH or PUSCH as well.

3. New Radio Access Technology System

As more and more communication devices require greater communication capacity, there is a need for mobile broadband communication enhanced over existing radio access technology (RAT). In addition, massive Machine-Type Communications (MTC) capable of providing a variety of services anywhere and anytime by connecting multiple devices and objects is also considered. Communication system design considering services/UEs sensitive to reliability and latency is also under discussion.

As such, introduction of new radio access technology considering enhanced mobile broadband communication, massive MTC, and Ultra-Reliable and Low Latency Communication (URLLC) is being discussed. In the present invention, for simplicity, this technology will be referred to as NewRAT or NR (New Radio).

3.1. Self-Contained Subframe Structure

Figure 13:
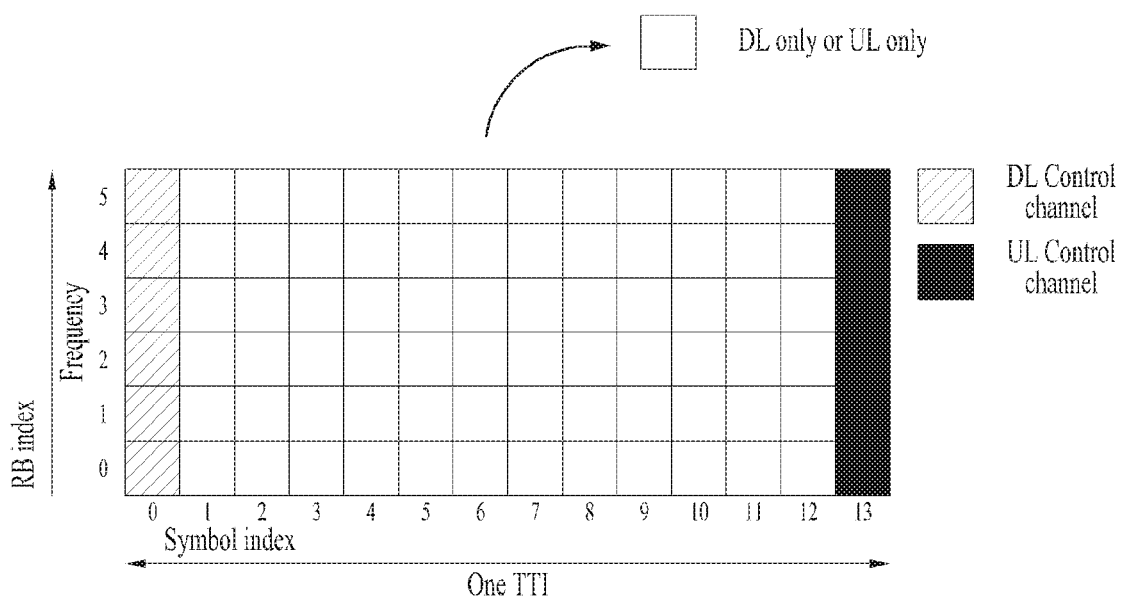
FIG. 13 is a diagram illustrating a self-contained subframe structure applicable to the present invention.

FIG. 13 is a diagram illustrating a self-contained subframe structure applicable to the present invention.

In the NR system to which the present invention is applicable, a self-contained subframe structure as shown in FIG. 13 is proposed in order to minimize data transmission latency in the TDD system.

In FIG. 13, the hatched region (e.g., symbol index=0) represents a downlink control region, and the black region (e.g., symbol index=13) represents an uplink control region.

The other region (e.g., symbol index=1 to 12) may be used for downlink data transmission or for uplink data transmission.

In this structure, DL transmission and UL transmission may be sequentially performed in one subframe. In addition, DL data may be transmitted and received in one subframe and UL ACK/NACK therefor may be transmitted and received in the same subframe. As a result, this structure may reduce time taken to retransmit data when a data transmission error occurs, thereby minimizing the latency of final data transmission.

In such a self-contained subframe structure, a time gap having a certain temporal length is required in order for the base station and the UE to switch from the transmission mode to the reception mode or from the reception mode to the transmission mode. To this end, some OFDM symbols at the time of switching from DL to UL in the self-contained subframe structure may be set as a guard period (GP).

While a case where the self-contained subframe structure includes both the DL control region and the UL control region has been described above, the control regions may be selectively included in the self-contained subframe structure. In other words, the self-contained subframe structure according to the present invention may include not only the case of including both the DL control region and the UL control region but also the case of including either the DL control region or the UL control region alone, as shown in FIG. 13.

For simplicity of explanation, the frame structure configured as above is referred to as a subframe, but this configuration can also be referred to as a frame or a slot. For example, in the NR system, one unit consisting of a plurality of symbols may be referred to as a slot. In the following description, a subframe or a frame may be replaced with the slot described above.

3.2. OFDM Numerology

The NR system uses the OFDM transmission scheme or a similar transmission scheme. Here, the NR system may typically have the OFDM numerology as shown in Table 3.

TABLE 3

| Parameter | Value |
|---|---|
| Subcarrier-spacing (Δf) | 75 kHz |
| OFDM symbol length | 13.33 us |
| Cyclic Prefix (CP) length | 1.04 us/0.94 us |
| System BW | 100 MHz |
| No. of available subcarriers | 1200 |

TABLE 3-continued

| Parameter | Value |
|---|---|
| Subframe length | 0.2 ms |
| Number of OFDM symbol per Subframe | 14 symbols |

Alternatively, the NR system may use the OI-DM transmission scheme or a similar transmission scheme, and may use an OFDM numerology selected from among multiple OFDM numerologies as shown in Table 4. Specifically, as disclosed in Table 4, the NR system may take the 15 kHz subcarrier-spacing used in the LTE system as a base, and use an OFDM numerology having subcarrier-spacing of 30, 60, and 120 kHz, which are multiples of the 15 kHz subcarrier-spacing.

In this case, the cyclic prefix, the system bandwidth (BW) and the number of available subcarriers disclosed in Table 4 are merely an example that is applicable to the NR system according to the present invention, and the values thereof may depend on the implementation method. Typically, for the 60 kHz subcarrier-spacing, the system bandwidth may be set to 100 MHz. In this case, the number of available subcarriers may be greater than 1500 and less than 1666. Also, the subframe length and the number of OFDM symbols per subframe disclosed in Table 4 are merely an example that is applicable to the NR system according to the present invention, and the values thereof may depend on the implementation method.

TABLE 4

| Parameter | Value | Value | Value | Value |
|---|---|---|---|---|
| Subcarrier-spacing (Δf) | 15 kHz | 30 kHz | 60 kHz | 120 kHz |
| OFDM symbol length | 66.66 | 33.33 | 16.66 | 8.33 |
| Cyclic Prefix (CP) length | 5.20 us/4.69 us | 2.60 us/2.34 us | 1.30 us/1.17 us | 0.65 us/0.59 us |
| System BW | 20 MHz | 40 MHz | 80 MHz | 160 MHz |
| No. of available subcarriers | 1200 | 1200 | 1200 | 1200 |
| Subframe length | 1 ms | 0.5 ms | 0.25 ms | 0.125 ms |
| Number of OFDM symbol per Subframe | 14 symbols | 14 symbols | 14 symbols | 14 symbols |

3.3. Analog Beamforming

In a millimeter wave (mmW) system, since a wavelength is short, a plurality of antenna elements can be installed in the same area. That is, considering that the wavelength at 30 GHz band is 1 cm, a total of 100 antenna elements can be installed in a 5*5 cm panel at intervals of 0.5 lambda (wavelength) in the case of a 2-dimensional array. Therefore, in the mmW system, it is possible to improve the coverage or throughput by increasing the beamforming (BF) gain using multiple antenna elements.

In this case, each antenna element can include a transceiver unit (TXRU) to enable adjustment of transmit power and phase per antenna element. By doing so, each antenna element can perform independent beamforming per frequency resource.

However, installing TXRUs in all of the about 100 antenna elements is less feasible in terms of cost. Therefore, a method of mapping a plurality of antenna elements to one TXRU and adjusting the direction of a beam using an analog phase shifter has been considered. However, this method is disadvantageous in that frequency selective beamforming is impossible because only one beam direction is generated over the full band.

To solve this problem, as an intermediate form of digital BF and analog BF, hybrid BF with B TXRUs that are fewer than Q antenna elements can be considered. In the case of the hybrid BF, the number of beam directions that can be transmitted at the same time is limited to B or less, which depends on how B TXRUs and Q antenna elements are connected.

Figure 14:
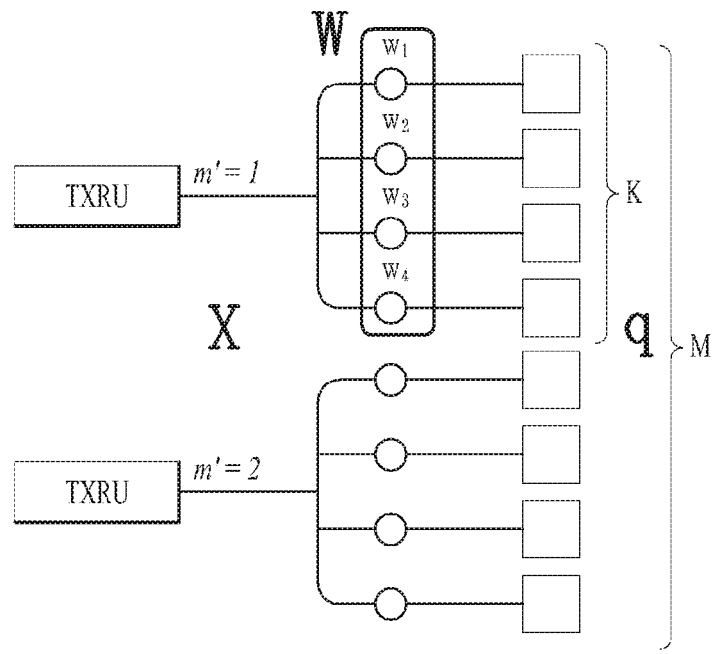
FIGS. 14 and 15 are diagrams illustrating representative methods for connecting TXRUs to antenna elements.
Figure 15:
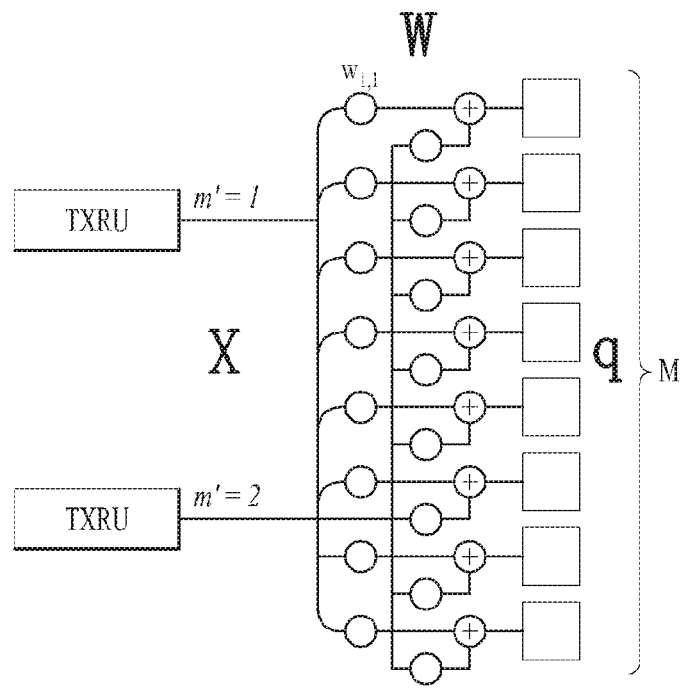

FIGS. 14 and 15 are diagrams illustrating representative methods for connecting TXRUs to antenna elements. Here, the TXRU virtualization model represents the relationship between TXRU output signals and antenna element output signals.

FIG. 14 shows a method for connecting TXRUs to sub-arrays. In FIG. 14, one antenna element is connected to one TXRU.

Meanwhile, FIG. 15 shows a method for connecting all TXRUs to all antenna elements. In FIG. 15, all antenna element are connected to all TXRUs. In this case, separate addition units are required to connect all antenna elements to all TXRUs as shown in FIG. 15.

In FIGS. 14 and 15, W indicates a phase vector weighted by an analog phase shifter. That is, W is a major parameter determining the direction of the analog beamforming. In this case, the mapping relationship between CSI-RS antenna ports and TXRUs may be 1:1 or 1-to-many The configuration shown in FIG. 14 has a disadvantage in that it is difficult to achieve beamforming focusing but has an advantage in that all antennas can be configured at low cost.

On the contrary, the configuration shown in FIG. 15 is advantageous in that beamforming focusing can be easily achieved. However, since all antenna elements are connected to the TXRU, it has a disadvantage of high cost.

3.4. CSI Feedback

In the 3GPP LTE or LTE-A system, user equipment (UE) has been defined to report channel state information (CSI) to a base station (BS or eNB). Herein, the CSI refers to information indicating the quality of a radio channel (or link) formed between the UE and an antenna port.

For example, the CSI may include a rank indicator (RI), a precoding matrix indicator (PMI), and a channel quality indicator (CQI).

Here, RI denotes rank information about the corresponding channel, which means the number of streams that the UE receives through the same time-frequency resource. This value is determined depending on the channel's Long Term Fading. Subsequently, the RI may be fed back to the BS by the UE, usually at a longer periodic interval than the PMI or CQI.

The PMI is a value reflecting the characteristics of a channel space and indicates a precoding index preferred by the UE based on a metric such as SINR.

The CQI is a value indicating the strength of a channel, and generally refers to a reception SINR that can be obtained when the BS uses the PMI.

In the 3GPP LTE or LTE-A system, the base station may set a plurality of CSI processes for the UE, and receive a report of the CSI for each process from the UE. Here, the CSI process is configured with a CSI-RS for specifying signal quality from the base station and a CSI-interference measurement (CSI-IM) resource for interference measurement.

4. Proposed Embodiments

Figure 16:
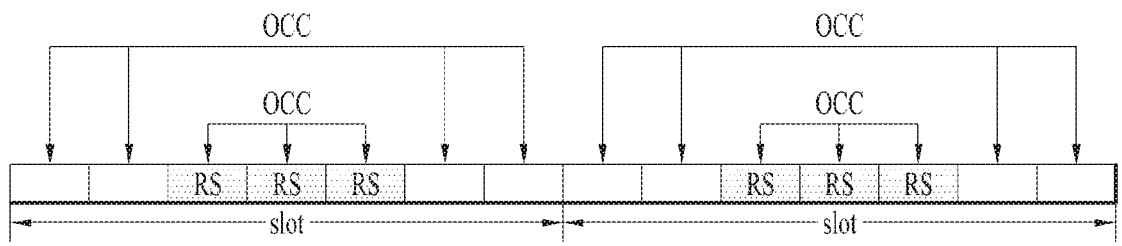
FIG. 16 is a diagram illustrating a signal configuration in physical uplink control channel (PUCCH) format 1/1a/1b in an LTE system.

FIG. 16 is a diagram illustrating a signal configuration in PUCCH format 1/1a/1b in an LTE system.

As illustrated in FIG. 16, in PUCCH format 1/1a/1b of the LTE system, a demodulation reference signal (DM-RS) is transmitted across three symbols in one slot, and an HARQ-ACK is transmitted across the remaining four symbols in the slot.

The symbols carrying the HARQ-ACK are transmitted after a constant amplitude zero auto-correlation (CAZAC) sequence of length 12 is multiplied by a modulated HARQ-ACK symbol and then the product is subjected to inverse fast Fourier transform (IFFT) on the frequency axis. If the HARQ-ACK is 1 bit long (or one codeword), the HARQ-ACK is modulated in binary phase shift keying (BPSK), whereas if the HARQ-ACK is 2 bits long (or two codewords), the HARQ-ACK is modulated in quadrature phase shift keying (QPSK). In addition, the same HARQ-ACK symbol is configured in the four symbols, and multiplied by a length-4 orthogonal cover code (OCC) on the time axis, for transmission, in order to allow multiplexing between more UEs in the same resources. If up to 12 cyclic shifts (CSs) are used for the length-12 CAZAC sequence, and a length-3 OCC is considered for the DM-RS, up to 36 UEs may simultaneously attempt HARQ-ACK transmissions in one PUCCH format 1.

Figure 17:
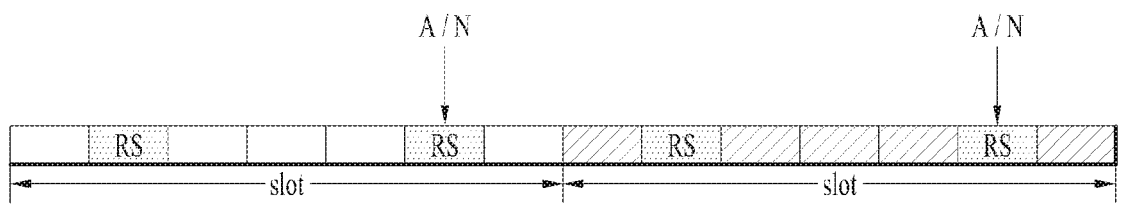
FIG. 17 is a diagram illustrating a signal configuration in PUCCH format 2/2a/2b in the LTE system.

FIG. 17 is a diagram illustrating a signal configuration in PUCCH format 2/2a/2b in the LTE system.

As illustrated in FIG. 17, in PUCCH format 2/2a/2b of the LTE system, a DM-RS is transmitted across four symbols in one subframe (SF), and CSI (e.g., an RI/PMI/CQI) is transmitted across the remaining 10 symbols in the subframe.

The CSI is configured to be 20 bits, and divided into 10 parts each including 2 bits. Then, 2-bit information is sequentially transmitted in each of the 10 symbols. Herein, each symbol is transmitted after a CAZAC sequence of length 12 is multiplied by a QPSK modulation symbol, and the product is subjected to IFNT on the frequency axis.

Further, HARQ-ACK information is transmitted in the second DM-RS symbol of each slot. If the HARQ-ACK is 1 bit long, the HARQ-ACK is modulated in BPSK, whereas if the HARQ-ACK is 2 bits long, the HARQ-ACK is modulated in QPSK. The modulated HARQ-ACK information is multiplied by the DM-RS, and transmitted equally in each slot.

Compared to the LTE system, it may be considered to transmit a PUCCH only in a part of the symbols of one subframe in an LTE-U system or an LAA system.

In addition, a method of transmitting UCI not in the total symbols of one subframe but in a part of the total symbols is considered for an NR system, as illustrated in FIG. 13. Similarly to in the LAA system, a PUCCH structure transmitted only in some symbols may be considered.

In this regard, the present invention proposes a scalable PUCCH format (or structure) or an RB-interlaced PUCCH format (or structure) on the basis of the above description.

4.1 Scalable PUCCH Format

As described before, a PUCCH format applicable to the NR system may be transmitted in some symbols. To this end, new PUCCH formats may be considered on the basis of PUCCH format 1' in which only an HARQ-ACK for one component carrier (CC) is transmitted, and PUCCH format 2' in which (periodic) CSI is basically transmitted, and in the presence of an HARQ-ACK, simultaneous transmission of the (periodic) CSI and the HARQ-ACK is supported, like PUCCH format 1 and PUCCH format 2.

Particularly, if transmission of HARQ-ACKs for multiple carriers is also allowed only in a specific carrier in a carrier aggregation (CA) situation in the NR system, the size of HARQ-ACK payload transmitted in the specific carrier may be variable according to transmission points. Further, considering that HARQ-ACKs corresponding to a plurality of DL subframes (or TTIs) in one carrier may also be transmitted in one PUCCH resource, a scalable PUCCH format may be required.

More specifically, if PUCCH format 1' supporting only an N1-bit (e.g., 2-bit) transmission and PUCCH format 2' supporting only an N2-bit (e.g., 22-bit) transmission are supported, a restriction may be imposed on transmission of an HARQ-ACK and/or CSI having X bits (N1<X<N2). In this context, the present invention proposes the following configurations as scalable PUCCH formats which may be transmitted adaptively according to variable UL control information (HARQ-ACK and/or CSI).

In an LAA system or NR system to which the present invention is applicable, one PUCCH resource may be defined by one symbol on the time axis by K UL control channel elements (CCEs) on the frequency axis. A reference signal (RS) and data may be mapped in each CCE. For example, the RS and the data may be mapped in frequency division multiplexing (FDM).

More specifically, the data may be mapped to Nd (e.g., Nd=1, 2, . . . , 11) of Nc (e.g., Nc=12) subcarriers, and the RS may be mapped to the remaining Nr (i.e., Nr=Nc—Nd) subcarriers.

Figure 18:
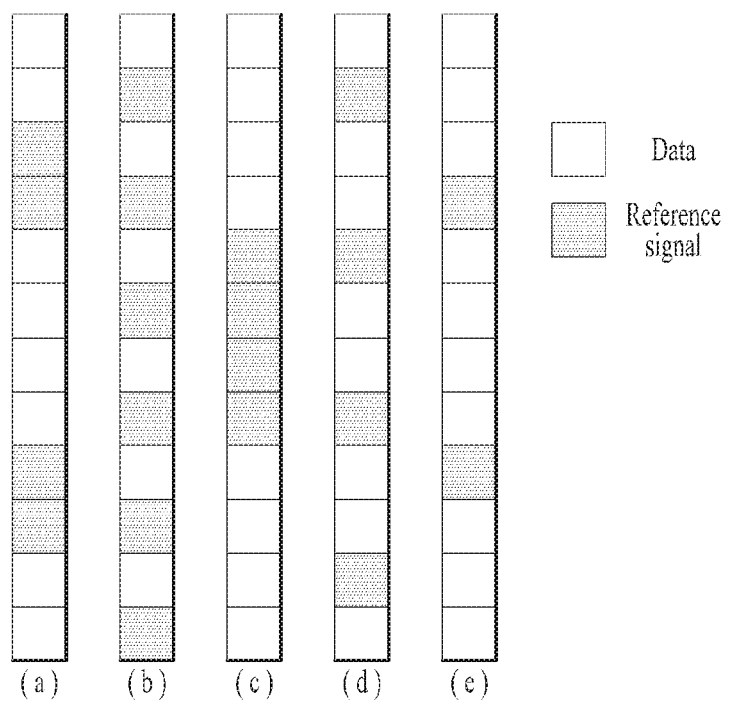
FIG. 18 is a diagram illustrating patterns of mapping a reference signal (RS) and data in one control channel element (CCE) according to an example of the present invention.

FIG. 18 is a diagram illustrating patterns of mapping an RS and data in one CCE according to an example of the present invention.

As in various examples illustrated in FIG. 18, an RS and data may be mapped to one CCE in various patterns. If one PUCCH resource is configured with a plurality of CCEs, one of the examples illustrated in FIG. 18 may be applied as a method of mapping (or configuring) an RS and data in a basic CCE unit.

Figure 19:
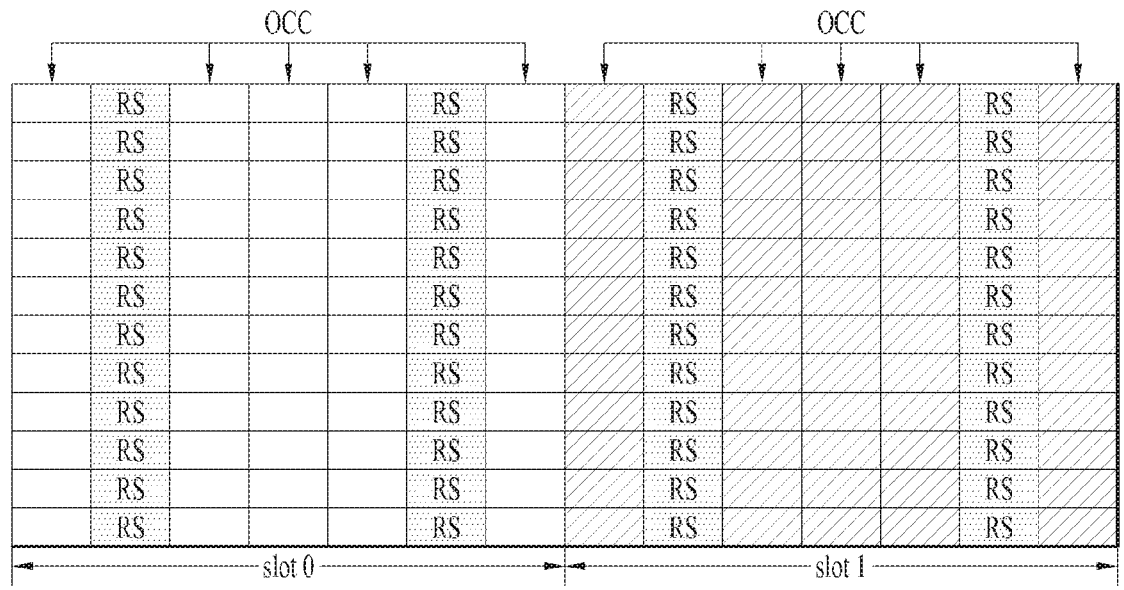
FIG. 19 is a diagram illustrating a signal configuration in PUCCH format 3 in the LTE system.

FIG. 19 is a diagram illustrating a signal configuration in PUCCH format 3 in the LTE system.

As illustrated in FIG. 19, in PUCCH format 3 of the LTE system, a data symbol which has been subjected to discrete Fourier transform (DFT) spreading across 12 subcarriers is transmitted repeatedly across 5 symbols in each slot, and multiplied by a length-5 OCC on the time axis, thereby allowing CDM of up to 5 UEs. Since one QPSK symbol is transmitted per RE, 48 coded bits may be transmitted in one RB pair.

In generating 48 coded bits by encoding, a different channel coding scheme is used according to the number of transmission bits.

If an input bit stream A has 11 or fewer bits, 48 coded bits are generated by applying (32, A) single Reed-Muller (RM) coding to the input bit stream A, and performing circular repetition on the RM-coded bits.

Figure 20:
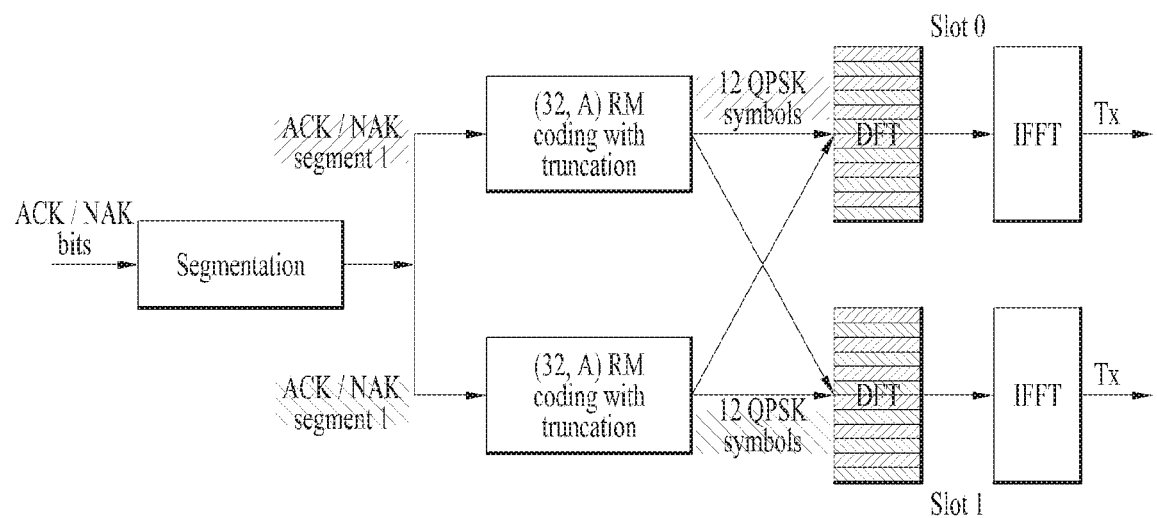
FIG. 20 is a diagram illustrating a channel coding method used when the number of transmission bits is equal to or larger than a predetermined value in the LTE system.

FIG. 20 is a diagram illustrating a channel coding method used when the number of transmission bits is equal to or larger than a predetermined value in the LTE system.

As illustrated in FIG. 20, if the size of the input bit stream A is larger than 11 bits, and equal to or less than 21 bits, the input bit stream is encoded by dual RM coding. Specifically, as illustrated in FIG. 20, the input bit stream A is divided into two segments, and each segment is encoded by (32, A) RM coding and truncated, thereby producing 24 bits. The output 24 bits per segment is symbol-interleaved. Subsequently, each UE transmits a signal generated by the above method in each slot.

Notably, in view of the nature of the NR or LAA system, a PUCCH configured only with at least one symbol may be transmitted. Specific related operations will be described in detail.

4.1.1 Method of Encoding Uplink Control Information (UCI) Bits

As described above, since a PUCCH configured only with at least one symbol may be transmitted in the NR or LAA system to which the present invention is applicable, an OCC may not be used on the time axis. Accordingly, CDM between UEs may not be supported on the time axis. Then, it may not be preferable to configure the same number of coded bits irrespective of the size of the input bit stream A.

Accordingly, a different number of coded bits may be configured according to the number of bits of an input bit stream A in the present invention. For example, in the case where X1 coded bits are configured for an input bit stream A having 11 or fewer bits, if the size of the input bit steam A is larger than 11 bits and equal to or less than 21 bits, X2 coded bits more than X1 bits may preferably be configured.

In a more specific example, if the input bit stream A has 11 or fewer bits, 32 coded bits may be generated by applying (32, A) single RM coding to the input bit stream A, without circular repetition. Or if the input bit stream A has a size larger than 11 bits and equal to or less than 21 bits, 64 coded bits may be generated by dividing the input bit stream A into two segments, and applying (32, A) RM coding to each segment.

In another example, if the input bit stream A has 11 or fewer bits, 24 coded bits may be generated by applying (32, A) single RM coding to the input bit stream A, and then truncating the RM-coded bits. Or if the input bit stream A has a size larger than 11 bits and equal to or less than 21 bits, a total of 48 coded bits with 24 coded bits per segment may be generated by dividing the input bit stream A into two segments, and applying (32, A) RM coding to each segment. In other words, as the input bit stream A has more bits, the input bit stream A may be encoded to more coded bits.

4.1.2 Coded Bit-Subcarrier Mapping Method and Multiplexing Method

According to the present invention, a UE may modulate X1 (or X2) coded bits in QPSK for Nd data subcarriers included in one CCE, and transmit the modulated bits in ceiling {X1/(2*Nd)} CCEs (or ceiling {X2/(2*Nd)} CCEs). The CCEs may be contiguous (on the frequency axis), forming one PUCCH resource. Or the CCEs (or CCE groups) may be distributed on the frequency axis, forming one PUCCH resource, so as to achieve frequency diversity.

For example, it is assumed that if the input bit stream A has 11 or fewer bits, 32 coded bits are generated, and if the input bit stream A has a size larger than 11 bits and equal to or less than 21 bits, 64 coded bits are generated. Then, it is assumed that 8 subcarriers out of 12 subcarriers carry data as in the structure illustrated in (a) of FIG. 18. In this case, if the input bit stream A has 11 or fewer bits, a PUCCH resource may be configured with 2 CCEs, and if the input bit stream A has a size larger than 11 bits and equal to or less than 21 bits, a PUCCH resource may be configured with 4 CCEs.

Additionally, the UE according to the present invention may transmit a PUCCH resource in CDM with other UEs. In other words, an eNB according to the present invention may support the same PUCCH resource in CDM for a plurality of UEs. In this case, the UE may transmit UCI by repeating some coded bits on a CCE basis (or on a subcarrier group basis) and applying an OCC to the repeated coded bits.

Figure 21:
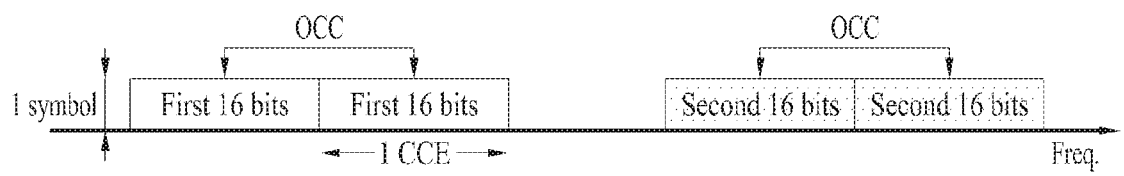
FIG. 21 is a diagram illustrating exemplary application of an orthogonal cover code (OCC) for uplink control information (UCI) transmission according to an example of the present invention.

FIG. 21 is a diagram illustrating exemplary application of an OCC for UCI transmission according to an example of the present invention.

As illustrated in FIG. 21, if the input bit stream A has 11 or fewer bits, the UE may divide 32 coded bits into two halves each including 16 bits (i.e., in units of a CCE), repeat each half, and apply an OCC to the repeated coded bits. In this manner, up to two UEs may be multiplexed in CDM. The CCEs to which the OCC is applied may be contiguous on the frequency axis as illustrated in FIG. 21, or contiguous on the time axis. Further, while transmission of UCI (or a PUCCH) is shown as confined to one symbol period in FIG. 21, the configuration illustrated in FIG. 21 may be extended to transmission of UCI (or a PUCCH) during a plurality of symbol periods.

Or a PUCCH resource may be configured in units of subcarrier groups each smaller than a CCE, not in units of CCEs. For example, 6 subcarriers may be grouped into one unit, and thus a PUCCH resource may be configured with a group of 6 subcarriers. If Nd=8 and X1=32, a PUCCH resource may be configured with four subcarrier groups each including 6 subcarriers. Herein, 8 coded bits may be modulated in QPSK and included in 4 subcarriers in each 6-subcarrier group.

Figure 22:
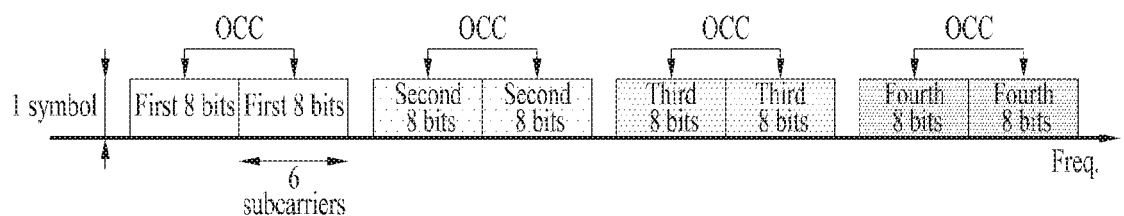
FIG. 22 is a diagram illustrating exemplary application of an OCC for UCI transmission according to another example of the present invention.

FIG. 22 is a diagram illustrating exemplary application of an OCC for UCI transmission according to another example of the present invention.

As illustrated in FIG. 22, the UE may apply an OCC, while repeating coded bits in the remaining 6 subcarriers of one CCE, in a similar manner to the method illustrated in FIG. 21. Thus, CDM between UEs may be supported. Or the coded bits may be repeated on the time axis (in an adjacent symbol), not on the frequency axis, thereby supporting the CDM effect.

Additionally, another PUCCH resource may be configured only with the remaining 6 subcarriers of one CCE. In this manner, the FDM effect may be achieved.

Further, as described before, one PUCCH resource may be defined by one symbol on the time axis by K CCEs on the frequency axis in the LAA or NR system to which the present invention is applicable.

In this case, the PUCCH resource may be divided into two areas (e.g., L (L<K) CCE(s) and (K-L) CCE(s)). Out of the two areas, the L CCEs(s) may be resources in which CDM with other UEs is allowed.

In this regard, the present invention proposes a method of configuring a maximum UCI size which may be included in each of the two areas (e.g., L (L<K) CCE(s) and (K-L) CCE(s)). Herein, it may be designed that as less UCI is included in the L CCE(s), PUCCHs of more UEs are multiplexed. Preferably, less UCI may be loaded for a smaller L value. Herein, the L-CCE area in which multiplexing is allowed may overlap with L CCEs of another PUCCH resource.

Hereinbelow, it is assumed that one PUCCH resource is defined by one symbol on the time axis by 6 CCEs on the frequency axis, for the convenience of description. It is also assumed that the PUCCH resource is divided into two halves each including 3 CCEs.

On the assumption that the 3 CCEs of each half may include 1-bit UCI or 11-bit UCI, a total of three combinations of PUCCH resource configurations may be produced.

Figure 23:
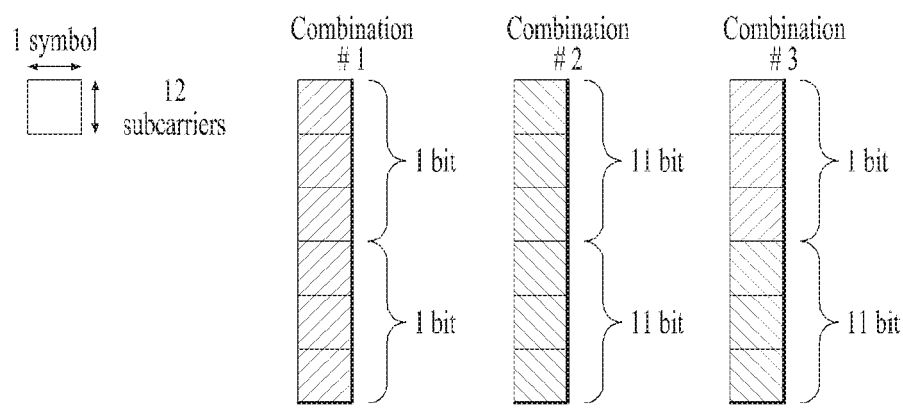
FIG. 23 is a diagram illustrating exemplary combinations of PUCCH resources according to the present invention.

FIG. 23 is a diagram illustrating exemplary combinations of PUCCH resources according to the present invention.

As illustrated in FIG. 23, the UE is capable of transmitting a 2-bit PUCCH in PUCCH resources configured in combination #1, a 22-bit PUCCH in PUCCH resources configured in combination #2, and a 12-bit PUCCH in PUCCH resources configured in combination #3.

In this way, if a PUCCH resource is determined on the basis of a combination according to the present invention, the UE may advantageously select and transmit an appropriate PUCCH according to the size of intended UCI.

If each CCE is an RB, multiplexing between UEs may be supported in 3 RBs capable of carrying 1 bit, whereas multiplexing between UEs may not be supported in 3 RBs capable of carrying 11 bits. In this case, overlap between different PUCCH resources may be allowed as illustrated in FIG. 24.

However, if overlap between PUCCH resources is not allowed, a PUCCH resource may be configured only with a multiple of 6 RBs. In this case, 4 RBs except for 96 (6*16) RBs may be wasted, not used as PUCCH resources in a 100-RB system.

FIG. 24 is a diagram illustrating exemplary overlap between PUCCH resources according to the present invention.

As illustrated in FIG. 24, if overlap between PUCCH resources, up to 99 of 100 RBs in total may be used for PUCCHs.

Further, transmission bits corresponding to Combination #3 in FIG. 23 may be configured by separately encoding the sets of 3 RBs, or by jointly encoding the whole input bit stream and then subjecting the coded bits to subcarrier mapping.

If separate coding is applied to the example of FIG. 23, the UE may modulate 1-bit UCI (or the CCEs carrying 1 bit) in BPSK, include the same modulation symbol in each data subcarrier, and apply an OCC on a subcarrier basis. In this manner, it may be designed that CDM between a plurality of UEs is possible. Further, for 11-bit UCI (or the CCEs carrying 11 bits), the UE may encode the UCI by (32, A) single RM coding, and truncate (or circularly repeat) the RM-coded UCI, thereby producing 24 (or 48) coded bits, as described before in section 4.1.1. If Nd (the number of data subcarriers) is 8, BPSK (or QPSK) symbols may be transmitted in 3 CCEs without an OCC. Considering that the reliability of 1-bit information is higher than that of information in the remaining bits, the 1-bit information may be HARQ-ACK information for a specific carrier (e.g., PCell), and the remaining 11-bit information may be HARQ-ACK information and CSI for another carrier.

Or, if joint coding is applied, the UE may generate 50 coded bits by applying (32, A) dual RM coding to a total of 12 bits, and then truncating the RM-coded bits. Out of the 50 coded bits, 2 coded bits may be transmitted by including the same modulation symbol in each data subcarrier of 3 CCEs and applying an OCC on a subcarrier basis. In this manner, it may be designed that CDM between a plurality of UEs is possible. Further, if Nd=8, the remaining 48 coded bits may be transmitted without applying an OCC to QPSK symbols included in 3 CCEs, as described before in section 4.1.1.

In configuring a maximum UCI size allowed in each of two areas (e.g., L CCE(s) and (K-L) CCE(s)) divided from a PUCCH resource as described before, the L CCE(s) and the (K-L) CCE(s) may be contiguous or non-contiguous on the frequency axis.

Further, this configuration may easily be extended to a method of configuring a PUCCH resource by dividing the PUCCH resource into two or more areas.

4.2 RB-Interlaced PUCCH Format

In a Release-14 enhanced LAA (eLAA) system to which the present invention is applied, UL transmission of a UE in an unlicensed band, and RB-interlaced PUSCH transmission compliant with regulations for an occupied bandwidth and a power spectral density (PSD) were introduced.

RB-interlaced PUSCH transmission amounts to transmitting a PUSCH in resources defined by a predetermined number of interlaces by a UE.

A 100-RB system (i.e., a system bandwidth of 20 MHz) includes a total of 10 interlaces, each interlace including 10 RBs. Further, a 50-RB system (i.e., a system bandwidth of 10 MHz) includes a total of 5 interlaces, each interlace including 10 RBs. As such, the RBs of each interlace are distributed equi-distantly with a spacing of 10 RBs.

According to the present invention, the eNB may basically allocate a PUSCH resource in units of interlaces to the UE. In other words, the eNB may allocate a PUSCH resource of 10 RBs, 20 RBs, 30 RBs, or the like to the UE.

Further, a sounding reference signal (SRS) may be transmitted in the last symbol of a subframe as in the LTE system. Further, the SRS may be transmitted only as a wideband SRS. That is, the SRS may be transmitted across the center 96 RBs in the 100-RB system. Herein, two or four combs may be configured according to a configuration.

Further, a PUCCH may be introduced to the eLAA system to which the present invention is applicable. In this case, the PUCCH may be transmitted across an entire subframe (e.g., a 1-ms full SF), or across a part of the symbols of the subframe.

FIG. 25 is a diagram illustrating an exemplary subframe configuration applicable to an NR system or an LAA system according to an example of the present invention.

As illustrated in FIG. 25, one subframe may be configured as a DL subframe, a UL subframe, or a subframe in which DL and UL co-exist in the NR system or LAA system to which the present invention is applicable. A PUCCH may be transmitted in a small number of symbols of a subframe SF # N+3 (e.g., an ending partial subframe). In this case, for multiplexing between UEs or co-existence with an SRS, a comb-type PUCCH may be considered.

Additionally, for efficient use of PUCCH resources, a PUCCH which is not transmitted across a total band, compared to an SRS, and which is configured in an RB-interlaced structure like a PUSCH may be considered. Thus, the present invention proposes a method of configuring a comb-type PUCCH resource in an RB-interlaced structure, and a PUCCH transmission method based on this PUCCH configuration method.

As described before, the following PUCCH configurations may be extended to the NR system as well as the LAA system to which the present invention is applicable.

4.2.1 PUCCH Structure (One Symbol Case)

4.2.1.1 DM-RS and Data Structure (Bottom-Up Approach)

Figure 26:
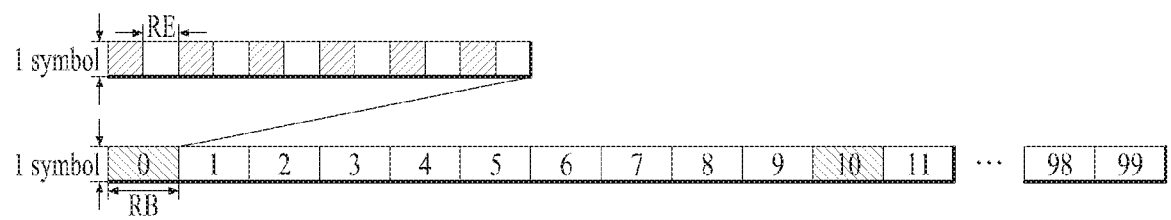
FIG. 26 is a diagram illustrating an exemplary PUCCH configuration based on a resource block (RB)-interlaced structure.

FIG. 26 is a diagram illustrating an exemplary PUCCH configuration in an RB-interlaced structure.

As illustrated in FIG. 26, considering that a PUCCH is transmitted only in one symbol in a 100-RB system, if two combs are applied to each RB in one interlace configured with $0^{th}$, $10^{th}$, $20^{th}$, ..., $90^{th}$ RBs, only 6 REs out of 12 REs per RB may be valid resources available for a PUCCH.

Specifically, options may be classified according to number of combs as listed in Table 5 below. First, a first option (Opt 1) represents a configuration of transmitting a PUCCH in all REs without dividing the resources of a specific RB into combs. A second option (Opt 2) represents a configuration of transmitting a PUCCH by dividing an RB into two combs and thus distinguishing even-numbered REs from odd-numbered REs. A third option (Opt 3) and a fourth option (Opt 4) represent configurations of transmitting a PUCCH by dividing 12 REs equi-distantly according to a predetermined number of combs.

TABLE 5

| | Number of combs | Available REs per RB |
|---|---|---|
| Opt1 | 1 | 12 |
| Opt2 | 2 | 6 |
| Opt3 | 4 | 3 |
| Opt4 | N | 12/N |

For the convenience of description, a minimum unit of REs that form a PUCCH is defined as an uplink resource element group (UREG), and one uplink control channel element (UCCE) may be configured with UREGs. One or more UCCEs may form a PUCCH resource. The size of a UCCE or PUCCH resource may be equal to, less than, or larger than the number (e.g., 10) of RBs included in one interlace.

Further, various alternatives may be available according to numbers of REs included in a UREG, and a data-DM-RS ratio. While the following description is given in the context of a UREG including 3 REs or 6 REs, by way of example, the configuration of the present invention may also be extended easily to different UREG configurations from the above UREG configuration.

(1) First Alternative (UREG=3 REs)

Figure 27:
FIG. 27 is a diagram illustrating an example of uplink resource element groups (UREGs) according to the present invention.

FIG. 27 is a diagram illustrating an example of UREGs according to the present invention.

In FIG. 27, 'D' represents data, and 'R' represents an RS (e.g., DM-RS).

As illustrated in (a) of FIG. 27, two REs of a UREG according to the present invention may be used for data, and the remaining one RE may be used for an RS. Or as illustrated in (b) of FIG. 27, two REs of a UREG according to the present invention may be used for an RS, and the remaining one RE may be used for data. The REs of the UREG may be physically contiguous or apart from each other by a predetermined spacing. In other words, the REs of the UREG may be localized or distributed.

If Opt 1 of Table 5 is applied, the UREGs illustrated in FIG. 27 may be repeated four times, and carry an RS and data in each RB. If the structure illustrated in (a) of FIG. 27 is applied, PUCCH data may be transmitted in 80 (2*4*10) REs per interlace. Or, if PUCCH data is transmitted only in C RBs out of 10 RBs included in a specific interlace, the UE may transmit the PUCCH data in {2*4*C} REs.

Or, if Opt 3 of Table 5 is applied, the UREGs illustrated in FIG. 27 may be transmitted only once in each RB, and the REs of a UREG may be arranged apart from each other by 4 REs. If the structure illustrated in (a) of FIG. 27 is applied, PUCCH data may be transmitted in 20 (2*10) REs per interlace.

Accordingly, 10 UREGs form one UCCE, and one UCCE may be considered to be one PUCCH resource. Or 5 UREGs form one UCCE, and two UCCEs may be considered to be one PUCCH resource.

(2) Second Alternative (UREG=6 REs)

Figure 28:
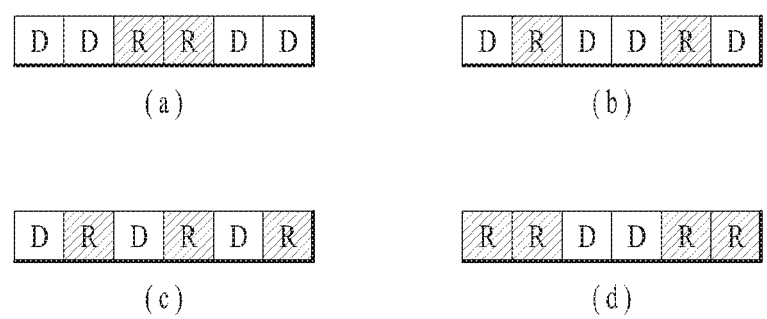
FIG. 28 is a diagram illustrating another example of UREGs according to the present invention.

FIG. 28 is a diagram illustrating another example of UREGs according to the present invention.

In FIG. 28, 'D' represents data, and 'R' represents an RS (e.g., DM-RS), as is with the case of FIG. 7.

Specifically, (a) and (b) of FIG. 28 illustrate UREGs each including data and an RS at 4:2 (REs), (c) of FIG. 28 illustrates a UREG including data and an RS at 3:3 (REs), and (d) of FIG. 28 illustrates a UREG including data and an RS at 2:4 (REs). For each ratio, the actual positions of an RS and data may be different. Further, it is also possible to configure data and an RS at a different ratio (e.g., data: RS=1:5 or 5:1 (REs)) from those illustrated in FIG. 28.

If Opt 1 of Table 5 is applied, the UREGs illustrated in FIG. 28 may be repeated twice, and carry an RS and data in each RB. If the example illustrated in (a) of FIG. 28 is applied, the UE may transmit PUCCH data in 80(4*2*10) REs per interlace. Or if PUCCH data is transmitted only in C RBs out of 10 RBs included in a specific interlace, the UE may transmit the PUCCH data in {4*2*C} REs.

Or if Opt 3 of Table 5 is applied, the UREGs illustrated in FIG. 28 may be transmitted in two RBs, and the REs of a UREG may be arranged apart from each other by 4 REs. If the example illustrated in (a) of FIG. 28 is applied, the UE may transmit PUCCH data in 20(4*10/2) REs per interlace.

4.2.1.2 DM-RS and Data Structure (Top-Down Approach)

The method of configuring UREGs equi-distantly according to the number of combs and the number of REs per UREG has been described as a PUCCH resource configuration method in the foregoing section 4.2.1.1. As a different approach, this section proposes that total RB areas configurable as a PUCCH are first allocated, areas such as an SRS/PUCCH/PUSCH/PRACH for a different (or the same) UE in a corresponding RB area are indicated, and a PUCCH resource is configured with the remaining areas.

For example, an eNB according to the present invention may transmit, to a UE, information indicating that one specific interlace (i.e., 10 RBs) is allocated as a PUCCH resource, a PUSCH is allocated to two RBs out of the 10 RBs, and an SRS is allocated in odd-numbered REs in the remaining 8 RBs. Upon receipt of the information, the UE may be aware that only 48 REs out of the total 120 REs are valid for PUCCH transmission.

Thus, the UE according to the present invention may transmit PUCCH data in one or more REs determined from among the 48 REs according to the number of REs in a UREG, a method of configuring data and RS REs in a UREG, and the number of UCCEs in one PUCCH resource, which are predetermined (or configured by scheduling DCI or layer-1 (L1) signaling). If the number of REs in a UREG is 6, and a PUCCH resource includes one UCCE, the UE may transmit UCI in a PUCCH resource configured with 8 UREGs, as in the example illustrated in (b) of FIG. 28.

4.2.1.3. Sequence-Based PUCCH Structure

According to the PUCCH structure defined in the afore-described section 4.2.1.1, a UREG includes data and an RS. Upon receipt of a PUCCH of the above structure, an eNB may estimate a channel from REs carrying an RS, and decode data by using the estimated channel information.

Meanwhile, a PUCCH structure with a UREG (or UCCE) configured as one sequence is proposed in this section. Upon receipt of a PUCCH of this structure, the eNB may receive PUCCH information by non-coherent detection (or on-off keying). In this case, the number of available REs per RB may be determined according to the number of combs, and it may be determined whether a UCCE configured with one or more UREGs is to be transmitted in one or more RBs, similarly to Table 5 and the afore-described first alternative/second alternative.

For example, if a UREG (or UCCE) includes 12 REs, a set of a plurality of (quasi-)orthogonal sequences transmittable in the 12 REs may be defined (e.g., CAZAC sequences). If X (quasi-)orthogonal sequences are defined by using cyclic shifts (CSs) or the like, it may be defined that one of the (quasi-)orthogonal sequences includes ACK information, and another (quasi-)orthogonal sequence includes NACK information.

If the number of combs is 2 (e.g., Opt 2 in Table 5), 6 REs are available per RB, and thus the UE may transmit a corresponding sequence across 2 RBs. That is, up to 5 sequences per interlace may be transmitted, and 5 sequences including different PUCCH data information may be transmitted in a specific interlace. Or sequences including fully same (or partially same) PUCCH data information may be transmitted. In this case, the corresponding sequences may be repeated accurately equally, or may be transmitted differently by applying phase shifts thereto. Or the corresponding sequences may be multiplied by OCCs on the frequency axis, for transmission.

Compared to the configurations described in sections 4.2.1.1 and 4.2.1.2, the PUCCH structure proposed in section 4.2.1.3 may be more preferable for small payload. Accordingly, one of the above-described various PUCCH structures may be applied according to the size of payload to be transmitted. For example, it may be regulated that if the size of UCI is equal to or less than K (e.g., 2) bits, a PUCCH of the PUCCH structure proposed in section 4.2.1.3 is applied, and otherwise, a PUCCH of the PUCCH structure proposed in section 4.2.1.1 or section 4.2.1.2 is applied.

Additionally, the numbers of combs defined in Table 5 may be set to be different according to RB positions (and/or symbol positions). For example, the number of combs is set to 1 only for $0^{th}$, $1^{st}$, $98^{th}$, and $99^{th}$ RBs, and the number of combs may be set to 2 for the remaining RBs, in consideration of an SRS transmitted in the center 96 RBs in a 20-MHz system. Therefore, an interlace including the $0^{th}$, $1^{st}$, $98^{th}$, and $99^{th}$ RBs and any other interface may have different maximum transmittable UCI payload sizes.

4.2.2. PUCCH Structure (Multi-Symbol Case)

As described before, the PUCCH structure transmitted in one symbol has been proposed in section 4.2.1. Compared to the legacy LTE system in which a PUCCH is transmitted in 14 symbols or 13 symbols, a time taken to transmit the above-proposed PUCCH is relatively much shortened. Therefore, the amount of energy consumed for the PUCCH transmission is also reduced significantly.

On the other hand, the reduced energy for the PUCCH transmission may result in a great decrease in the transmission coverage of the PUCCH. In this context, a method of transmitting a PUCCH in a plurality of (e.g., 2 or more) symbols is proposed in order to make up for the reduction of the transmission coverage of a PUCCH.

To this end, a method of first configuring a 1-symbol PUCCH as proposed in section 4.2.1 and then transmitting the PUCCH in a plurality of symbols may be considered. Herein, the PUCCH may be designed so as to be repeatedly transmitted in other interlaces (according to a pre-defined interlace hopping rule), to thereby achieve a frequency diversity gain.

In another method, if one PUCCH resource is configured only with a part of RBs included in an interlace, a PUCCH may be designed so as to be repeatedly transmitted in other RBs of the same interlace, to thereby achieve a frequency diversity gain. Or if a PUCCH is transmitted across a plurality of symbols, the PUCCH may be designed such that the PUCCH is repeatedly transmitted but multiplied by an OCC on a symbol-by-symbol basis, thereby achieving a CDM gain between UEs.

In view of the nature of an unlicensed band in which a UE can access a channel on the basis of an LBT result, the UE may have difficulty in transmitting UCI at a desired time point, and may transmit UCI, which has not been transmitted because a channel has not been secured, at one time after the channel is secured. As such, the size of UCI that the UE is supposed to transmit may be changed. Thus, as UCI payload increases, a multi-symbol PUCCH structure may be considered. In this case, different UCI may be transmitted in each symbol. For this purpose, a method of extending the PUCCH structure proposed in the afore-described section 4.2.1 along the time axis may be applied. For example, if a 2-symbol PUCCH is considered in a 20-MHz system, a PUCCH structure may be designed on the assumption of 200 RBs (with 100 RBs per symbol). More specifically, interlaces to which the PUCCH is to be mapped are configured on the assumption of 200 RBs, and resources in which the actually configured interlaces are transmitted may be mapped on the basis of interlaces in each symbol.

Further, a PUCCH configured with one or more symbols may be utilized in a normal UL subframe. If a PUCCH configured with one or more symbols is utilized in a normal UL subframe, a frequency area in which the PUCCH is transmitted may not be multiplexed with another PUSCH in another symbol. Accordingly, it may be preferred that a PUCCH configured with one or more symbols is also transmitted in another symbol in the frequency area carrying the corresponding PUCCH.

For example, if a PUCCH is configured with 2 symbols, symbol #0/symbol #1 may be allocated for PUCCH transmission of UE1, symbol #2/symbol #3 may be allocated for PUCCH transmission of UE2, . . . , symbol #12/symbol #13 may be allocated for PUCCH transmission of UE7. Or, to protect DM-RS transmission in symbol #3/symbol #10, the symbol (i.e., symbol #3/symbol #10) may be excluded from allocation for a PUCCH. Or, in consideration of a gap for the usage of LBT applicable to symbol #0 or symbol #13, a PUCCH transmission may not be allocated to the symbol (i.e., symbol #0/symbol #13). Or, in order to generate a gap for the LBT usage before a PUCCH transmission, a symbol gap may exist between PUCCH regions. For example, once a PUCCH transmission is allocated to symbol #1/symbol #2, symbol #3 may be configured as a gap for the LBT usage, and a next PUCCH resource may be allocated to symbol #4/symbol #5.

Notably, if an SRS is configured to be transmitted only in the last symbol of a specific subframe, and a PUCCH may be transmitted in the last second symbol as well as the last symbol due to application of a multi-symbol PUCCH, the starting point of transmission of the PUCCH may be different from the starting point of transmission of the SRS. For example, UE1 to which an SRS transmission is allocated will attempt LBT shortly before the boundary of the last symbol, whereas UE2 to which a PUCCH transmission is allocated may attempt LBT shortly before the boundary of the last second symbol. Herein, if UE2 starts the PUCCH transmission earlier than the SRS transmission of UE1, UE1 is highly likely to determine that a channel is busy as a result of the LBT. Therefore, UE1 may fail to transmit the SRS.

To solve the above problem, a PUCCH transmission and an SRS transmission may be separated on the time axis. For example, among symbol #0 to symbol #13 that form one subframe, symbol #13 may be defined as an SRS symbol, and symbol #10/symbol #11 may be defined as a PUCCH symbol. Herein, the UE may perform LBT for the SRS transmission during symbol #12.

Or, even though a PUCCH is transmitted across a plurality of symbols, the starting position of an SRS transmission may be aligned with the starting position of a PUCCH transmission. For example, if a 2-symbol PUCCH is transmitted across the last two symbols of a specific subframe, it may be indicated that the SRS of the subframe is to be transmitted in the last second symbol (and the last symbol) (by higher-layer signaling or DL/UL scheduling DCI). In this manner, if the starting position of the PUCCH is aligned with the starting position of the SRS, an LBT area for the PUCCH and an LBT area for the SRS are shared. Thus, each of the transmissions does not interfere with the other transmission.

In the case where SRS and PUCCH transmissions in the same subframe are indicated to the same UE, and the PUCCH transmission in the last two symbols is indicated, once the UE succeeds in LBT for the PUCCH transmission, the UE may attempt the SRS transmission as well as the PUCCH transmission. If overlap between an SRS region and a PUCCH region is indicated, the SRS transmission may be dropped. Or if it is indicated that an SRS and a PUCCH are transmitted simultaneously in the same symbol, it may be configured that the SRS transmission is always dropped irrespective of whether the transmission areas overlap with each other on the frequency axis.

4.2.3 UCI RE Mapping

According to the present invention, as in the legacy LTE system, a channel coding scheme (e.g., RM coding or tail biting convolutional code (TBCC) coding) may be determined according to the number of bits of UCI. If the number of coded bits does not match an actually available PUCCH resource, the coded bits may be rate-matched through truncation or circular repetition, for transmission.

For example, if the number A of UCI bits is equal to or less than 11, (32, A) single RM coding may be applied. If 11<A<22, (32, A) dual RM coding may be applied. If A>=22, a 8-bit cyclic redundancy check (CRC) and a ⅓-rate TBCC may be applied.

In another example, according to Opt 1 in Table 5, an RS and data may be transmitted by repeatedly mapping UREGs illustrated in FIG. 28 four times to each RB. Specifically, if the example illustrated in (a) of FIG. 28 is applied, the UE may transmit PUCCH data in 80 (2*4*10) REs per interlace. That is, if QPSK is adopted for modulation, up to 160 coded bits may be transmitted. If the number of UCI bits is 32 (i.e., A=32), the UE may transmit 160 bits by circularly repeating 120(={32+8}*3) coded bits.

4.2.4 PUCCH Resource Allocation

For allocation of a PUCCH resource for the DM-RS and data structure (bottom-up approach) proposed in the afore-described section 4.2.1.1., the UE may need the following information. In other words, if the eNB according to the present invention allocates the DM-RS and data structure (bottom-up approach) proposed in section 4.2.1. to the UE, the eNB may provide at least the following information to the UE.

The number of combs (or an option to be applied from among the options listed in Table 5).

A comb index (if the number of combs is 2 or larger, the index of only one comb to be used for a PUCCH transmission is indicated).

The number of REs included in a UREG.

A ratio between RS REs and data REs, and RE positions in the UREG.

The number of UCCEs included in a PUCCH resource.

The number of symbols included in the PUCCH resource.

The starting position of the PUCCH resource (e.g., symbol X, 25 μsec after the boundary of symbol X, or 25 μsec+timing advance (TA) after the boundary of symbol X).

Further, for allocation of a PUCCH resource for the DM-RS and data structure (top-down approach) proposed in the afore-described section 4.2.1.2., the UE may need the following information. In other words, if the eNB according to the present invention allocates the DM-RS and data structure (top-down approach) proposed in section 4.2.2. to the UE, the eNB may provide at least the following information to the UE.

Total RB areas available for a PUCCH.
An excluded RE/RB area among the RB areas.
The number of REs included in a UREG.
A ratio between RS REs and data REs, and RE positions in the UREG.
The number of UCCEs included in a PUCCH resource.
The number of symbols included in the PUCCH resource.
The starting position of the PUCCH resource (e.g., symbol X, 25 μsec after the boundary of symbol X, or 25 μsec+TA after the boundary of symbol X).

For allocation of a PUCCH resource for the sequence-based PUCCH structure proposed in the afore-described section 4.2.1.3., the UE may need the following information.

The number of combs (or an option to be applied from among the options listed in Table 5).
A comb index (if the number of combs is 2 or larger, the index of only one comb to be used for a PUCCH transmission is indicated).
The number of REs included in a UREG.
The number of UCCEs included in a PUCCH resource.
The number of symbols included in the PUCCH resource.
The starting position of the PUCCH resource (e.g., symbol X, 25 μsec after the boundary of symbol X, or 25 μsec+timing advance (TA) after the boundary of symbol X).

In an embodiment applicable to the present invention, part of the above information may be preset, or may be configured by higher-layer signaling, or by scheduling DCI or L1 scheduling.

More specifically, for the foregoing PUCCH allocation, a method similar to an ACK/NACK resource indicator (ARI) transmitted in a DL grant in the legacy LTE system may be applied. For example, the eNB may pre-configure N combinations of {interlace index (or some RBs in a specific interlace index)+comb index} by RRC signaling, and indicate a PUCCH resource to be allocated from among the N resources by actual scheduling DCI. The combinations of PUCCH resources pre-configured by RRC signaling may be part of the proposed information, and a DL grant or separate DCI indicating a PUCCH may be applied as a signal means that dynamically indicates a PUCCH resource.

In another embodiment applicable to the present invention, a PUCCH resource may implicitly be configured according to the position of a resource carrying scheduling DCI. More specifically, for the foregoing PUCCH resource allocation, a method similar to the implicit mapping relationship between PUCCH indexes of PUCCH format 1/1a/1b and lowest CCE indexes of a PDCCH in the legacy LTE system may be applied. For example, PUCCH resource indexes may be configured for a plurality of PUCCH resources each being {interlace index (or some RBs in a specific interlace index)+comb index+OCC+CS}, and it may be regulated that a PUCCH resource index is induced on the basis of a PDCCH CCE index function.

As such, in the PUCCH structures proposed in section 4.2.1. and section 4.2.3., the UE may configure a PUCCH resource with REs corresponding to a corresponding resource by using an interlace index (or some RBs in a specific interlace index) and a comb index which are indicated by the foregoing various indication methods.

Or, in the PUCCH structure proposed in section 4.2.2., the UE may configure a PUCCH resource, except for REs corresponding to a corresponding resource by using an interlace index (or some RBs in a specific interlace index) and/or a comb index which is indicated by the foregoing various indication methods.

The proposed PUCCH configuration methods are generally applied to other RB allocation methods such as consecutive RBs or clustered RBs as well as RB-interlaced allocation. In this case, the constituent REs of a PUCCH may be configured in a comb type, and thus the above-described comb-type PUCCH structure, UCI RE mapping, and PUCCH resource allocation are applicable.

The foregoing proposed methods may be implemented independently of other proposed methods, or in combination (or merged) according to embodiments. Further, it may be regulated that information indicating whether the proposed methods are applied (or information about the rules of the proposed methods) is indicated to a UE by a pre-defined signal (or a physical-layer or higher-layer signal) by an eNB.

Like the above methods, the present invention proposes a method of transmitting and receiving a PUCCH in one or two symbols in the time domain by one or more REs included in one or more of interlaces configured in units of RBs in the frequency domain by a UE and an eNB, compared to the conventional technology.

For example, a resource carrying the PUCCH may be configured with one symbol in the time domain.

In this case, a frequency resource carrying the PUCCH may be configured with one interlace including RBs apart from each other by 10 RBs in one symbol. For example, in a 100-RB system (i.e., a system bandwidth of 20 MHz), the frequency resource carrying the PUCCH may be configured with one of a total of 10 interlaces.

Herein, the frequency resource carrying the PUCCH may be configured with the total frequency band (or REs) of the one interlace, or a comb-type frequency band (or REs) apart from another frequency band by a predetermined spacing in the one interlace. For example, if the frequency resource carrying the PUCCH is configured with a comb-type frequency band (or REs), an SRS may be transmitted in a frequency resource in which the PUCCH is not transmitted in the one interlace.

Further, the frequency band (or REs) carrying the PUCCH may be configured, more specifically, with a frequency band (or REs) carrying PUCCH data and a frequency band (or REs) carrying an RS (DM-RS). The frequency band (or REs) carrying PUCCH data and the frequency band (or REs) carrying an RS (DM-RS) may be configured at the same ratio in the one interlace.

In another example, the resource carrying the PUCCH may be configured with two symbols in the time domain.

In this case, an interlace carrying the PUCCH may be configured independently in each symbol. Specifically, in a 100-RB system (i.e., a system bandwidth of 20 MHz), the PUCCH may be transmitted in a $3^{rd}$ interlace in a first symbol, and a $5^{th}$ interlace in a second symbol.

Or although frequency resources carrying the PUCCH in the two symbols are included in one interlace, the frequency resource (or RB) carrying the PUCCH may be different in each symbol. More specifically, the PUCCH may be transmitted in $6^{th}$ to $10^{th}$ RBs of one interlace including 10 RBs in the first symbol, and in $1^{st}$ to $5^{th}$ RBs of the interlace in the second symbol.

Or, if the frequency resources carrying the PUCCH in the two symbols are included in one interlace, an OCC may be applied to the transmitted PUCCH signal on a symbol-by-symbol basis.

In this way, the UE may configure a PUCCH resource carrying a PUCCH in various manners. To this end, the UE may explicitly or implicitly receive information indicating a PUCCH resource from the eNB.

5. Device Configuration

Figure 29:
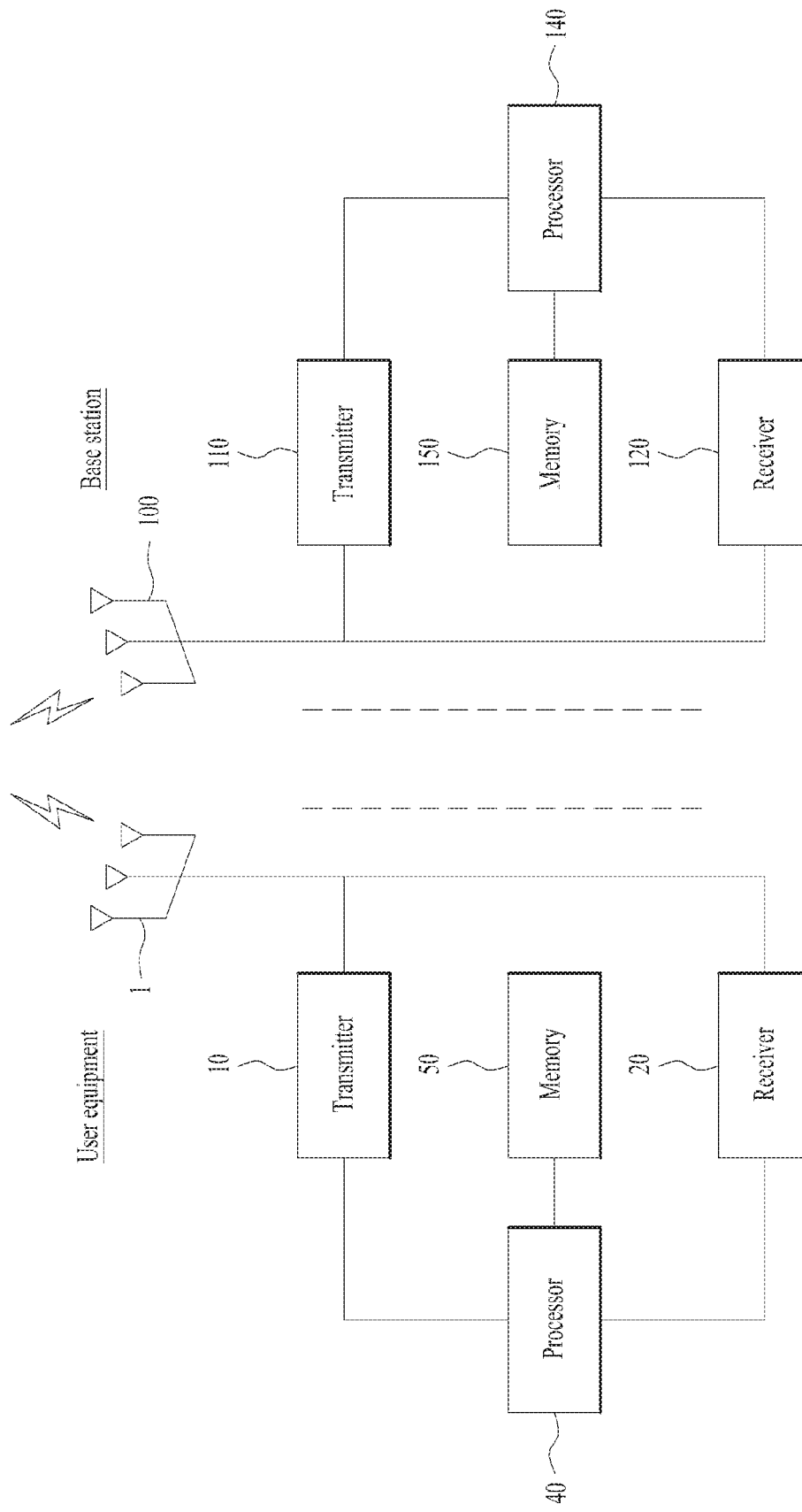
FIG. 29 is a block diagram of a user equipment (UE) and a base station (BS) for implementing the proposed embodiments.

FIG. 29 is a diagram illustrating configurations of a UE and a base station capable of being implemented by the embodiments proposed in the present invention. The UE and the base station shown in FIG. 29 operate to implement the embodiments of the method for transmitting and receiving PUCCH.

A UE 1 may act as a transmission end on a UL and as a reception end on a DL. A base station (eNB or gNB) 100 may act as a reception end on a UL and as a transmission end on a DL.

That is, each of the UE and the base station may include a Transmitter (Tx) 10 or 110 and a Receiver (Rx) 20 or 120, for controlling transmission and reception of information, data, and/or messages, and an antenna 30 or 130 for transmitting and receiving information, data, and/or messages.

Each of the UE and the base station may further include a processor 40 or 140 for implementing the afore-described embodiments of the present disclosure and a memory 50 or 150 for temporarily or permanently storing operations of the processor 40 or 140.

The UE 1 having the above configuration may determine the PUCCH resource to be one or more REs included in one or more interlaces including RBs spaced from each other by the same spacing in the frequency domain in one or two symbols. Subsequently, the UE may transmit the PUCCH in the determined PUCCH resource through the transmitter 10.

In relation to the above operation, the base station 100 may transmit information indicating a PUCCH resource to the UE 1 through the transmitter 110. Subsequently, the base station 100 may receive a PUCCH in the PUCCH resource from the UE 1 through the receiver 120. The PUCCH resource may be configured with one or more REs included in one or more interlaces including RBs spaced from each other by the same spacing in the frequency domain in one or two symbols.

The Tx and Rx of the UE and the base station may perform a packet modulation/demodulation function for data transmission, a high-speed packet channel coding function, OFDM packet scheduling, TDD packet scheduling, and/or channelization. Each of the UE and the base station of FIG. 29 may further include a low-power Radio Frequency (RF)/Intermediate Frequency (IF) module.

Meanwhile, the UE may be any of a Personal Digital Assistant (PDA), a cellular phone, a Personal Communication Service (PCS) phone, a Global System for Mobile (GSM) phone, a Wideband Code Division Multiple Access (WCDMA) phone, a Mobile Broadband System (MBS) phone, a hand-held PC, a laptop PC, a smart phone, a Multi Mode-Multi Band (MM-MB) terminal, etc.

The smart phone is a terminal taking the advantages of both a mobile phone and a PDA. It incorporates the functions of a PDA, that is, scheduling and data communications such as fax transmission and reception and Internet connection into a mobile phone. The MB-MM terminal refers to a terminal which has a multi-modem chip built therein and which can operate in any of a mobile Internet system and other mobile communication systems (e.g. CDMA 2000, WCDMA, etc.).

Embodiments of the present disclosure may be achieved by various means, for example, hardware, firmware, software, or a combination thereof.

In a hardware configuration, the methods according to exemplary embodiments of the present disclosure may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to the embodiments of the present disclosure may be implemented in the form of a module, a procedure, a function, etc. performing the above-described functions or operations. A software code may be stored in the memory 50 or 150 and executed by the processor 40 or 140. The memory is located at the interior or exterior of the processor and may transmit and receive data to and from the processor via various known means.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present disclosure or included as a new claim by a subsequent amendment after the application is filed.

INDUSTRIAL APPLICABILITY

The present disclosure is applicable to various wireless access systems including a 3GPP system, and/or a 3GPP2 system. Besides these wireless access systems, the embodiments of the present disclosure are applicable to all technical fields in which the wireless access systems find their applications. Moreover, the proposed method can also be applied to mmWave communication using an ultra-high frequency band.

What is claimed is:

1. A method for transmitting a physical uplink control channel (PUCCH) by a user equipment (UE) in a wireless communication system, the method comprising:
    determining one or more resource elements (REs) included in one or more interlaces as a PUCCH resource for transmitting the PUCCH, wherein the one or more interlaces are configured with resource blocks (RBs) apart from each other by a same spacing in a frequency domain in one or two symbols; and
    transmitting, to a base station (BS), the PUCCH in the PUCCH resource,
    wherein, when the PUCCH resource is configured with one symbol, the one or more REs are included in one interlace configured with RBs apart from each other by 10 RBs in the one symbol, and the one or more REs are configured with comb-type REs apart from each other by a same spacing among total REs of the one interlace.

2. The method according to claim 1, wherein when the one or more REs are configured with the comb-type REs, REs except for the comb-type REs among the total REs include a sound reference signal (SRS) RE carrying an SRS.

3. The method according to claim 1, wherein the one or more REs include one or more data REs carrying PUCCH data, and one or more reference signal (RS) REs carrying an RS.

4. The method according to claim 3, wherein a ratio between the data REs and the RS REs is equal in each RB included in the one interlace.

5. The method according to claim 1, wherein when the PUCCH resource is configured with two symbols, the one or more REs are included in one interlace configured independently for each of the two symbols.

6. The method according to claim 1, wherein when the PUCCH resource is configured with two symbols, the one or more REs are included in one interlace configured with RBs apart from each other by 10 RBs in the two symbols, and an RB including the one or more REs is different in each of the two symbols.

7. The method according to claim 1, wherein when the PUCCH resource is configured with two symbols, the one or more REs are included in one interlace configured with RBs apart from each other by 10 RBs in the two symbols, and wherein the transmitting the PUCCH includes transmitting the PUCCH by applying an orthogonal cover code (OCC) on each of the two symbols.

8. The method according to claim 1, further comprising:
receiving information indicating the PUCCH resource from the BS.

9. A communication device for transmitting a physical uplink control channel (PUCCH) in a wireless communication system, the communication device comprising:
a memory; and
a processor operably coupled with the memory and configured to:
determine one or more resource elements (REs) included in one or more interlaces as a PUCCH resource for transmitting the PUCCH, wherein the one or more interlaces are configured with resource blocks (RBs) apart from each other by a same spacing in a frequency domain in one or two symbols; and
transmit, to a base station (BS), the PUCCH in the PUCCH resource,
wherein, when the PUCCH resource is configured with one symbol, the one or more REs are included in one interlace configured with RBs apart from each other by 10 RBs in the one symbol, and the one or more REs are configured with comb-type REs apart from each other by a same spacing among total REs of the one interlace.

10. A communication device for receiving a physical uplink control channel (PUCCH) in a wireless communication system, the communication device comprising:
a memory; and
a processor operably coupled with the memory and configured to:
transmit, to a user equipment (UE), information indicating a PUCCH resource; and
receive, from the UE, the PUCCH in the PUCCH resource,
wherein the PUCCH resource includes one or more resource elements (REs) included in one or more interlaces configured with resource blocks (RBs) apart from each other by a same spacing in a frequency domain in one or two symbols, and
wherein, when the PUCCH resource is configured with one symbol, the one or more REs are included in one interlace configured with RBs apart from each other by 10 RBs in the one symbol, and the one or more REs are configured with comb-type REs apart from each other by a same spacing among total REs of the one interlace.

* * * * *